United States Patent
Gao et al.

(10) Patent No.: US 12,532,233 B2
(45) Date of Patent: Jan. 20, 2026

(54) ENSURING SERVICE CONTINUITY IN WIRELESS COMMUNICATIONS

(71) Applicant: ZTE Corporation, Guangdong (CN)

(72) Inventors: Yuan Gao, Shenzhen (CN); He Huang, Shenzhen (CN); Jinguo Zhu, Shenzhen (CN); Dapeng Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 622 days.

(21) Appl. No.: 17/969,173

(22) Filed: Oct. 19, 2022

(65) Prior Publication Data
US 2023/0054288 A1 Feb. 23, 2023

Related U.S. Application Data

(63) Continuation of application No. PCT/CN2020/085564, filed on Apr. 20, 2020.

(51) Int. Cl.
*H04W 36/00* (2009.01)
(52) U.S. Cl.
CPC ....... *H04W 36/0064* (2023.05); *H04W 36/13* (2023.05)
(58) Field of Classification Search
CPC . H04W 36/0055; H04W 36/08; H04W 36/00; H04W 36/13; H04W 36/0064
USPC ....................................................... 455/436
See application file for complete search history.

(56) References Cited

U.S. PATENT DOCUMENTS

| | | | |
|---|---|---|---|
| 1,169,005 A * | 1/1916 | Caswell et al. .......... | G01C 9/32 33/348 |
| 8,638,751 B2 * | 1/2014 | Venkatachalam ........................... | H04W 36/0033 370/216 |
| 9,775,045 B2 * | 9/2017 | Li .......................... | H04W 16/02 |
| 10,028,128 B2 * | 7/2018 | Salkintzis ............. | H04W 60/06 |
| 10,111,163 B2 * | 10/2018 | Vrzic .................... | H04W 72/12 |
| 10,321,371 B2 * | 6/2019 | Zhang ................... | H04W 36/22 |
| 10,506,489 B2 * | 12/2019 | Vrzic .................... | H04W 36/26 |

(Continued)

FOREIGN PATENT DOCUMENTS

| CN | 108347751 A | 7/2018 |
|---|---|---|
| CN | 108632927 A | 10/2018 |

(Continued)

OTHER PUBLICATIONS

Office Action for Japanese Patent Application No. 2022-563132, mailed Sep. 21, 2023, with English summary (5 pages).

(Continued)

*Primary Examiner* — Marceau Milord
(74) *Attorney, Agent, or Firm* — Perkins Coie LLP

(57) ABSTRACT

The present application relates to methods, systems, and devices related to digital wireless communication, and more specifically, to techniques related to supporting service continuity during a network handover. In one exemplary aspect, a method for wireless communication is disclosed. The method includes receiving a first message from a second network node, the first message including slice remapping assistance information. The method also includes handing over, based on a handover procedure, a network service for a terminal from the first network node to a target network node using the slice remapping assistance information or initiate a terminal context retrieve procedure using the slice remapping assistance information.

19 Claims, 8 Drawing Sheets

(56) References Cited

U.S. PATENT DOCUMENTS

| | | | |
|---|---|---|---|
| 10,630,410 B2* | 4/2020 | Parkvall | H04L 65/1023 |
| 10,893,405 B2* | 1/2021 | Zee | H04W 76/16 |
| 11,359,854 B2* | 6/2022 | Svejcar | F16K 31/047 |
| 11,564,079 B2* | 1/2023 | Lee | H04L 67/51 |
| 11,564,145 B2* | 1/2023 | Shekhar | H04W 40/04 |
| 2016/0353367 A1* | 12/2016 | Vrzic | H04W 28/0247 |
| 2016/0353465 A1* | 12/2016 | Vrzic | H04L 41/5054 |
| 2017/0079059 A1* | 3/2017 | Li | H04W 16/02 |
| 2017/0086118 A1* | 3/2017 | Vrzic | H04W 36/26 |
| 2017/0318450 A1* | 11/2017 | Salkintzis | H04W 48/14 |
| 2017/0331577 A1* | 11/2017 | Parkvall | H04W 8/18 |
| 2017/0339688 A1* | 11/2017 | Singh | H04W 72/51 |
| 2018/0124660 A1* | 5/2018 | Zhang | H04W 84/02 |
| 2019/0045351 A1* | 2/2019 | Zee | H04W 76/11 |
| 2019/0058997 A1* | 2/2019 | Futaki | H04W 36/1443 |
| 2019/0349774 A1* | 11/2019 | Lou | H04W 36/13 |
| 2020/0022061 A1 | 1/2020 | Jin et al. | |
| 2020/0120482 A1 | 4/2020 | Parkvall et al. | |
| 2020/0322778 A1* | 10/2020 | Lee | H04W 8/08 |
| 2021/0007022 A1 | 1/2021 | Yilmaz et al. | |
| 2021/0321264 A1 | 10/2021 | Lou et al. | |
| 2022/0070767 A1* | 3/2022 | Qiao | H04W 28/24 |
| 2022/0086688 A1 | 3/2022 | Jin et al. | |

FOREIGN PATENT DOCUMENTS

| | | | |
|---|---|---|---|
| CN | 108811020 A | 11/2018 | |
| CN | 110169125 B5 | 8/2019 | |
| CN | 110838927 A | 2/2020 | |
| EP | 3595358 A1 * | 1/2020 | H04W 76/27 |
| JP | 2020-505890 A | 2/2020 | |
| WO | WO-2018135992 A1 * | 7/2018 | H04W 48/18 |
| WO | 2019/030981 A1 | 2/2019 | |

OTHER PUBLICATIONS

Zte, "NW Slice Availability Handling Approaches during Mobility, "3GPP TSG RAN WG3 Meeting #95bis, R3-171029, Spokane, USA, Apr. 3-7, 2017 (6 pages).

Extended European Search Report for European Patent Application No. 20896435.3, mailed Nov. 27, 2023 (9 pages).

International Search Report and Written Opinion for International Application No. PCT/CN2020/085564, mailed on Dec. 18, 2020 (8 pages).

JPO, Decision to Grant for Japanese Application No. 2022-563132, mailed on Apr. 5, 2024, 5 pages with unofficial English translation.

CNIPA, First Office Action for Chinese Application No. 2020801000375, mailed on Jul. 16, 2024, 17 pages with unofficial English translation.

CNIPA, Second Office Action for Chinese Application No. 2020801000375, mailed on Jan. 9, 2025, 17 pages with unofficial English translation.

EPO, Communication pursuant to Article 94(3) EPC for European Application No. 20 896 435.3, mailed on Apr. 15, 2025, 6 pages.

LG Electronics Inc., "Discussion on slice list for failed PDU session in Path Switch procedure," 3GPP TSG-RAN WG3 Meeting #99, Athens, Greece, R3-181212, Feb. 26-Mar. 2, 2018, 3 pages.

CNIPA, Rejection Decision for Chinese Application No. 2020801000375, mailed on May 19, 2025, 21 pages with unofficial English translation.

KIPO, Office Action for Korean Application No. 10-2022-7036635, mailed on Jun. 23, 2025, 10 pages with unofficial English translation.

EPO, Communication pursuant to Article 94(3) EPC for European Application No. 20 896 435.3, mailed on Nov. 13, 2025, 5 pages.

* cited by examiner

ENSURING SERVICE CONTINUITY IN WIRELESS COMMUNICATIONS

CROSS REFERENCE TO RELATED APPLICATIONS

This patent document is a continuation of and claims benefit of priority to International Patent Application No. PCT/CN2020/085564, filed on Apr. 20, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to supporting service continuity during a network handover.

In one exemplary aspect, a method for wireless communication is disclosed. The method includes receiving a first message from a second network node, the first message including slice remapping assistance information. The method also includes handing over, based on a handover procedure, a network service for a terminal from the first network node to a target network node using the slice remapping assistance information or initiate a terminal context retrieve procedure using the slice remapping assistance information.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: receiving, by a first network node, a first message from a second network node, the first message including slice remapping assistance information; and handing over, based on a handover procedure, a network service for a terminal from the first network node to a target network node using the slice remapping assistance information or initiate a terminal context retrieve procedure using the slice remapping assistance information.

2. The solution of clause 1, wherein the slice remapping assistance information is either generated by the first network or received from a second network node.

3. The solution of clause 1, wherein the slice remapping assistance information comprises an indicator indicative of whether network slice remapping is supported by a core network node or a radio access network (RAN) for a specific terminal, a specific network slice, or a specific PDU session.

4. The solution of clause 3. wherein the indicator is configured by a separate list, as part of an allowed network slice selection assistance information listing, or as part of a slice support list item.

5. The solution of clause 3, wherein the indicator is configured as a separate information element or an information element inside a transparent container in a message containing the information allowing the first network node to perform network remapping.

6. The solution of clause 1, wherein the slice remapping assistance information comprises one or more target network slices or equivalent network slices of a network slice for a specific terminal, a specific slice, or a specific Protocol Data Unit (PDU) session.

7. The solution of clause 1, wherein the slice remapping assistance information comprises a cause value indicative of a reason that network remapping is not allowed.

8. The solution of clause 6, wherein the slice remapping assistance information comprises a quality of service (QoS) profile for each QoS flow in a target network slice or an equivalent network slice.

9. The solution of clause 1, wherein any of the first network node and the second network node comprise any of a core network node or a RAN node.

10. The solution of clause 1, wherein the slice remapping assistance information is transmitted from the second network node comprising a core network node to the first network node comprising a RAN node via any of: an initial context setup request message, a PDU session resource modify request message, a PDU session resource setup request message, a handover command message, a handover request message, a path switch request acknowledge message, a path switch request failure message, and a terminal context modification request message.

11. The solution of clause 1, wherein the information allowing the first network node to perform network remapping is transmitted from the first network node comprising a first RAN node to the second network node comprising a second RAN node via any of: a XN setup response message, a XN setup request message, a handover request message, a handover request acknowledge message, a handover preparation failure message, a retrieve terminal context request message, and a retrieve terminal context response message.

12. The solution of clause 8, wherein the slice assistance information is transmitted from a RAN node to a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message.

13. The solution of clause 1, wherein performing the handover procedure or retrieving the terminal context procedure further comprises: remapping, by the first network node, a specific network slice to a target network slice or an equivalent network slice.

14. The solution of clause 13, further comprising: sending, by the first network node, the target network slice or the equivalent network slice to the second network node and/or a third network node.

15. The solution of clause 14, wherein the second network node is configured to send the target network slice or equivalent network slice to the third network node.

16. The solution of any of clauses 14 and 15, wherein the first network node is a first RAN node, the second network node is a second RAN node or a first core network node, and the third node is a second core network node.

17. The solution of any of clauses 14 and 15, wherein the target network slice or equivalent network slice is sent from the first network node comprising a first RAN node to a second network node comprising a second RAN node via any of a XN setup response message, a XN setup request message, a handover request message, a handover request acknowledge message, a handover preparation failure message, a retrieve terminal context request message, and a retrieve terminal context response message.

18. The solution of any of clauses 14 and 15, wherein the target network slice or equivalent network slice is sent from the first network node comprising a first RAN node to a second network node comprising a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message.

19. The solution of any of clauses 14 and 15, wherein the target network slice or equivalent network slice is sent from the first network node comprising a core network node to a second network node comprising a RAN node via any of an initial context setup request message, a PDU session resource modify request message, a PDU session resource setup request message, a handover command message, a handover request message, a path switch request acknowledge message, a path switch request failure message, and a UE context modification request message.

20. The solution of clause 1, further comprising: initiating, by the first network node, a NG/S1 based handover procedure or a Xn/X2 based handover procedure to the second network node based on the slice remapping assistance information indicating that slice remapping is supported at the second network node.

21. The solution of clause 20, further comprising: sending, by the first network node, the slice remapping assistance information to a second network node configured to map a serving network slice to a target network slice or an equivalent network slice based on the received slice remapping assistance information.

22. The solution of clause 20, wherein the second network node is configured to remap a certain network slice to a target network slice or an equivalent network slice.

23. The solution of clause 22, wherein the second network node is configured to send the target network slice or the equivalent network slice to the first network node or a third network node.

24. The solution of clause 23, wherein the third network node comprises any of a RAN node or a core network node.

25. The solution of clause 23, wherein the target network slice or equivalent network slice is sent from a core network node to a RAN node via any of an initial context setup request message, a PDU session resource modify request message, a PDU session resource setup request message, a handover command message, a handover request message, a path switch request acknowledge message, a path switch request failure message, and a UE context modification request message.

26. The solution of clause 23, wherein the target network slice or equivalent network slice is sent from a first RAN node to a second RAN node via any of a XN setup response message, a XN setup request message, a handover request message, a handover request acknowledge message, and a handover preparation failure message.

27. The solution of clause 23, wherein the target network slice or equivalent network slice is sent from a RAN node to a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message.

28. The solution of clause 1, further comprising: initiating, by the first network node, the terminal context retrieve procedure to a second network node based on the slice remapping assistance information indicating that network slice remapping is supported at the second network node.

29. The solution of clause 28, further comprising: sending, by the first network node, slice remapping assistance information that includes slice assistance information to the second network node configured to map a serving network slice to a target network slice or an equivalent network slice to assist in performing network slice remapping.

30. The solution of clause 29, wherein the first network node is a first RAN node and the second network node is a second RAN node.

31. The solution of clause 29, wherein the second network node is configured to remap a serving network slice to a target network slice or an equivalent network slice.

32. The solution of clause 31, wherein the second network node is configured to send the target network slice or the equivalent network slice to the first network node or a third network node.

33. The solution of clause 32, wherein the third network node is a core network node.

34. The solution of clause 32, wherein the target network slice or equivalent network slice is sent from a RAN node to a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message.

35. The solution of clause 32, wherein the target network slice or equivalent network slice is sent from a first RAN node to a second RAN node via any of a retrieve UE context request message and a retrieve UE context response message.

36. An apparatus for wireless communication comprising a processor that is configured to carry out the solution of any of clauses 1 to 35.

37. A non-transitory computer readable medium having code stored thereon, the code when executed by a processor, causing the processor to implement a solution recited in any of clauses 1 to 35.

The details of one or more implementations are set forth in the accompanying attachments, the drawings, and the description below. Other features will be apparent from the description and drawings, and from the clauses.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

When a UE is handed over from a source cell to a target cell, different slices may be supported in the source and the target cell while the ongoing services can be carried on both the NW slice in source cell and the NW slice in the target cell.

Figure 1:
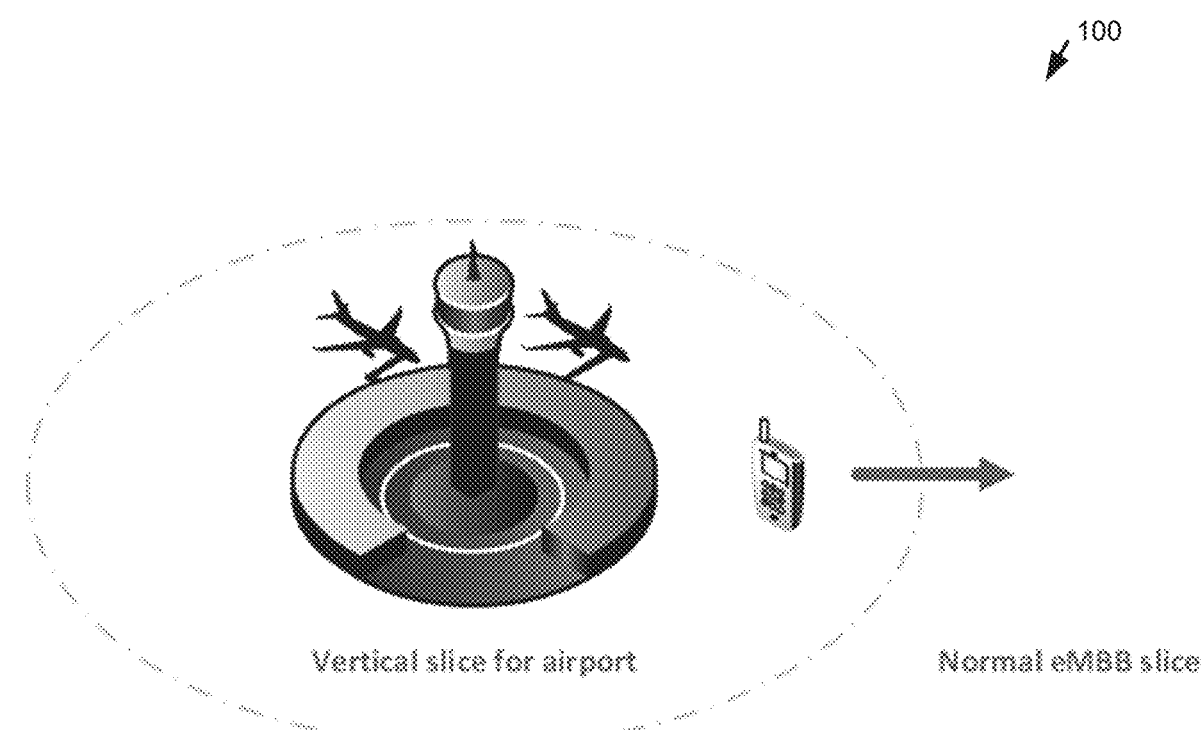
FIG. 1 is an example block diagram of an example scenario for service continuity during a handover.

FIG. 1 is a block diagram of an example scenario 100 for service continuity during a handover. For example, as shown in FIG. 1, an operator may deploy a vertical slice for an environment (e.g., an airport), in which the UE of the airport slice can have special Quality of Service (QoS) treatment and charge rate. Outside the vertical slice for airport, there may be normal NW slices for enhanced mobile broadband (eMBB) services as well, in which the "UE of airport" can be treated as a normal eMBB UE in both QoS treatment and charge rate. In the event that the UE moves from the airport slice to normal eMBB slice, the service continuity can be supported. Accordingly, the present embodiments relate to supporting service continuity during handover by taking the supported slice into consideration.

In many cases, existing handover procedures can be used to hand over a UE from a source radio access network (RAN) node to a target RAN node using Xn/X2 or NG/S1 reference points. The handover procedure can be triggered, for example, due to new radio conditions, load balancing, due to specific service, etc.

Figure 2:
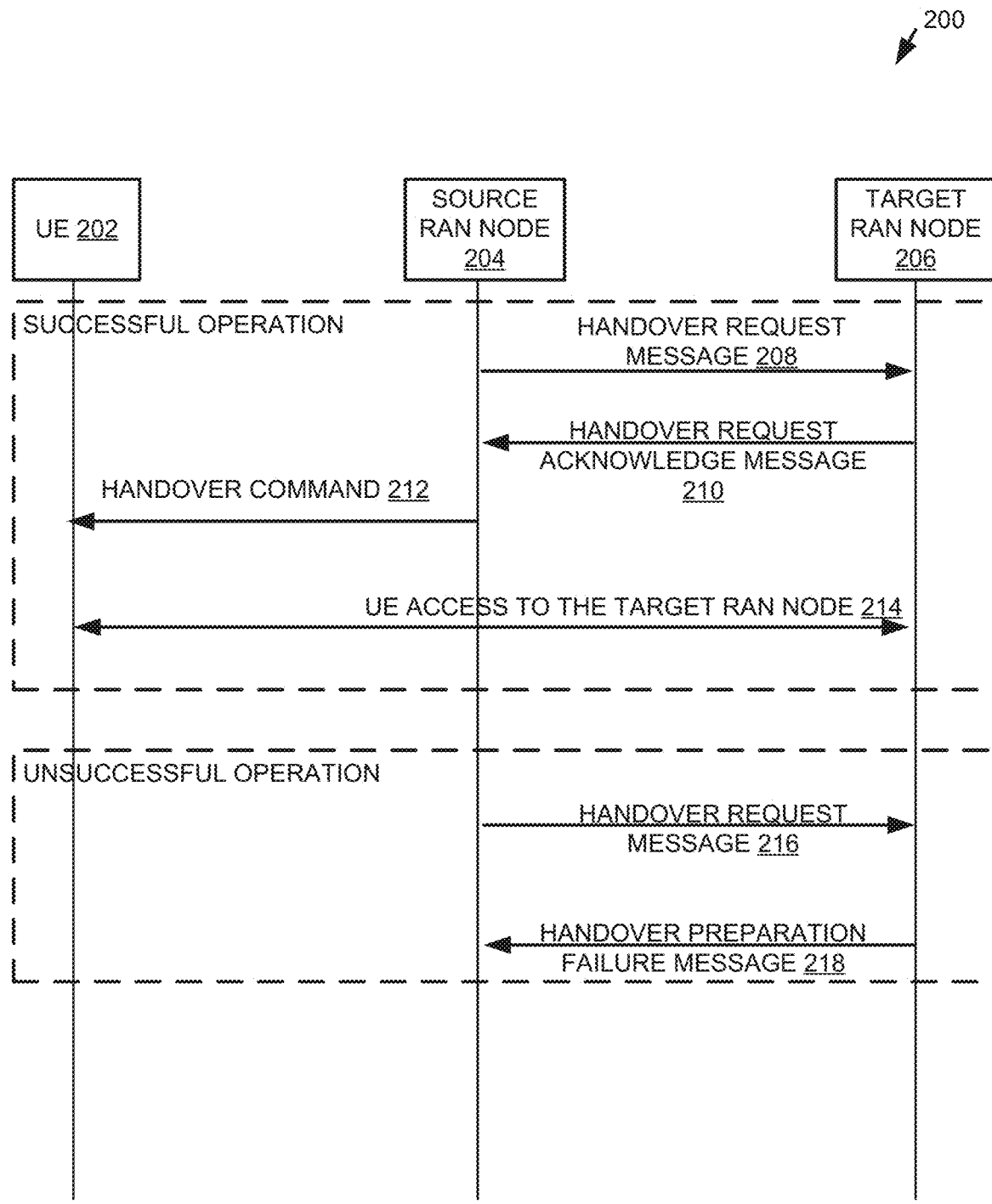
FIG. 2 is an example signaling process illustrating both a successful and unsuccessful Xn based handover procedure.

FIG. 2 is an example signaling process 200 illustrating both a successful and unsuccessful Xn based handover procedure. An example Xn based handover procedure is shown in FIG. 2.

During a successful operation, the source RAN node 204 can send a handover request message 208 to the target RAN node 206 and wait for the feedback from the target RAN node. If the target RAN node accepts this request, a handover request acknowledge message 210 will be send back to the source RAN node. The source RAN node 204 will then send handover command 212 to UE 202 so that UE will start access 214 to the target RAN node 206.

If the handover request 216 is not acceptable to the target RAN node, a handover preparation failure message 218 in which the cause IE is set to an appropriate value can be sent to the source node 204 to inform the reason for rejection. Particularly, the Cause IE can be set to slice(s) not supported by NG-RAN if the serving slice in the source RAN-node is not supported in the target node.

Figure 3:
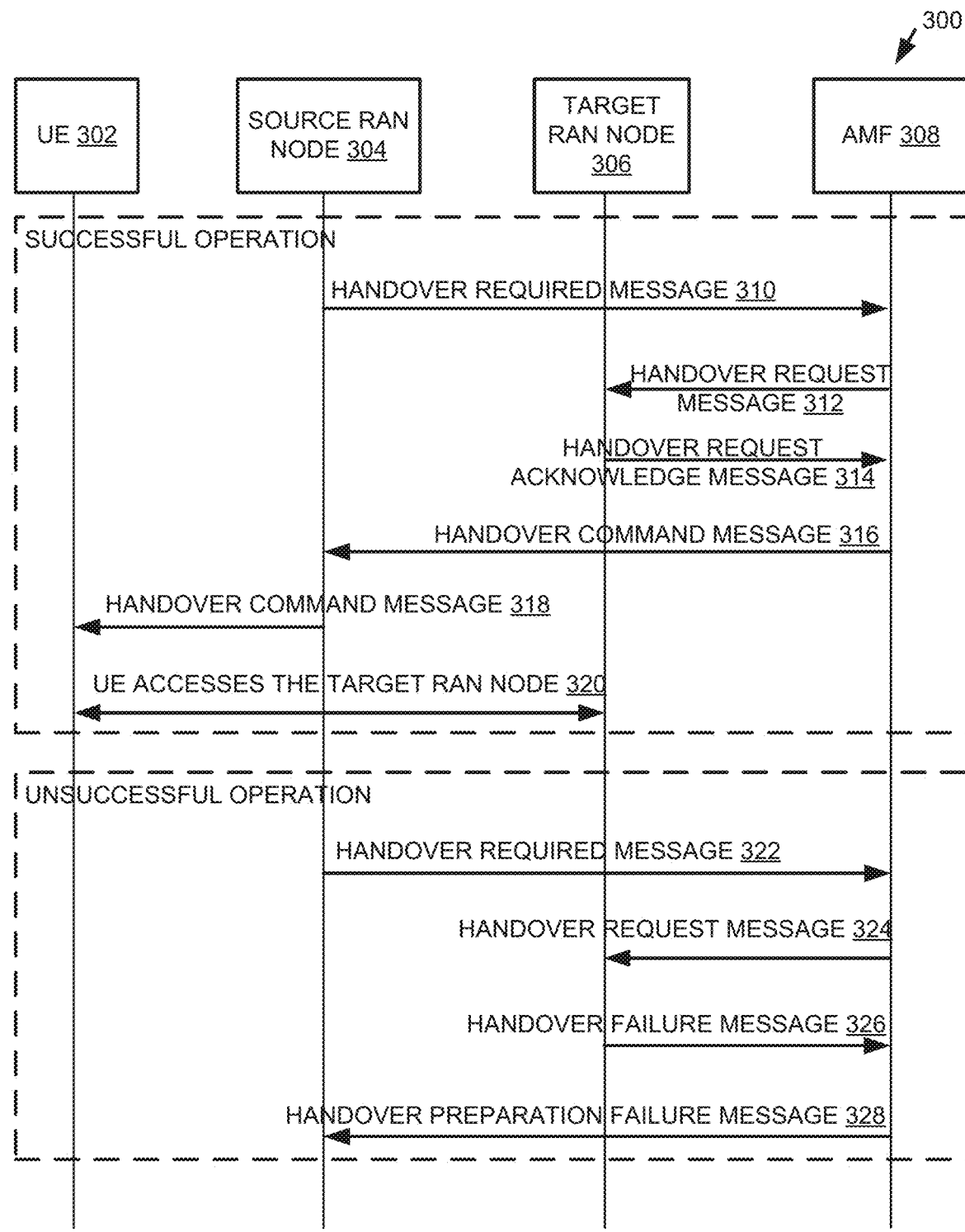
FIG. 3 is an example signaling process illustrating both a successful and unsuccessful NG based handover procedure.

FIG. 3 is an example signaling process 300 illustrating both a successful and unsuccessful NG based handover procedure. An example NG based handover procedure is shown in FIG. 3. The source RAN node 304 send handover required message 310 to the core network (CN) node (e.g., AMF 308) and CN can send handover request message 312 to the target RAN node 306 to reserve sources for the handover of a UE 302. If the target RAN node accepts this request, a handover request acknowledge message 314 can be send back to the CN node 308. The CN node can then send handover command message 316 to the source RAN node 304. The UE can start access 320 to the target RAN node 306 after receiving the handover command message 318 from the source RAN node.

In an unsuccessful operation, the source RAN node 304 can send a handover required message 322 to the AMF 308, and the AMF 308 can send a handover request message to the target RAN node 306. The target RAN node 306 can send a handover failure message 326 to the AMF if handover fails. If the CN node or the target side is not able to accept any of the PDU session resources or a failure occurs during the Handover Preparation, the AMF can send the handover preparation failure message 328 with an appropriate cause value to the source NG-RAN node. Particularly, the Cause IE may be set to Slice(s) not supported if the serving slice in the source RAN-node is not supported in the target node or CN node.

System Overview

In this disclosure, the present embodiments relate to supporting service continuity during handover by remapping the serving slices in the source RAN node to certain slices supported in the target RAN node. A first network node can perform a handover procedure or retrieve UE context procedure based on slice assistance information.

The slice assistance information can either be generated by the first network itself or provided by a second network node. For the case when the slice assistance information is generated by the first node, the first node may provide it to a second node during handover procedure or retrieve UE context procedure. The first network node can be a RAN node or a CN node. The CN node can be a AMF, a SMF, or any other core network node. The second network node can be a RAN node or a CN node. The RAN node can be a gNB, an eNB, a ng-eNB, a en-gNB, or any other radio access network node.

Issue 1

With a first issue, the slice assistance information can include various information. As a first alternative, the slice assistance information can include indicators showing whether the CN based remapping or the slice remapping assistance information is supported or not. The indicator can be configured per UE, per PDU session or per slice.

A per UE indicator can be used to indicate whether the slice remapping is supported by the CN. For example, with this indicator, the source node can initiate the CN based handover whenever the on-going slice may not be supported by the target node.

The per slice indicator can be used to indicate whether the CN based slice re-mapping is applicable to one specific slice. For example, with this indicator, the source node can initiate the CN based handover whenever the on-going slice may not be supported by the target node and the slice re-mapping is applicable to the on-going slice. The per slice indicator may be configured by a separate list (e.g., a list of S-NSSAI for which the re-mapping operation is applicable in CN), or as part of an Allowed NSSAI (e.g., the indicator can be included in an Allowed NSSAI-Item).

A per PDU session indicator can be configured as part of PDU session configuration, and it can be used to indicate whether the CN based slice remapping is applicable to this PDU session. The per PDU session indicator can be configured as a separate IE in the message exchanged between CN node and RAN node or between two RAN nodes or in the PDU Session Resource Setup Request Transfer container, PDU Session Resource Setup Response Transfer container, PDU Session Resource Setup Unsuccessful Transfer container, PDU Session Resource Modify Request Transfer container, the PDU Session Resource Modify Response Transfer container, the Handover Required Transfer container, the Handover Command Transfer container, the Handover Request Acknowledge Transfer container, the Handover Resource Allocation Unsuccessful Transfer container, the Path Switch Request Transfer container, the Path Switch Request Acknowledge Transfer container, the Path Switch Request Setup Failed Transfer container, and/or the Path Switch Request Unsuccessful Transfer container.

As a second alternative, the slice assistance information can include indicators showing whether the RAN based remapping or the slice remapping assistance information is supported or not. The indicator can be configured per UE, per PDU session or per slice.

A per UE indicator can be used to indicate whether the slice remapping is supported by the concerned RAN node. With this indicator, the source node can initiate the Xn based handover whenever the on-going slice may not be supported by the target node.

A per slice indicator can be used to indicate whether the RAN based slice re-mapping is applicable to one specific slice. For example, the source node can initiate the RAN based handover whenever the on-going slice may not be supported by the target node and the slice re-mapping is applicable to the on-going slice. Alternatively, the source node can initiate the X2/Xn based handover anyway, and it may be up to target node to check whether the remapping is allowed or not. The per Slice indicator may be configured by a separate list (e.g. a list of S-NSSAI for which the re-mapping operation is applicable in RAN node), or as part of Allowed NSSAI (e.g., the indicator can be included in Allowed NSSAI-Item, or as part of Slice Support List-Item).

A per PDU session indicator can be configured as part of PDU session configuration, and it can be used to indicate whether the RAN based slice remapping is applicable to this PDU session. The per PDU session indicator can be configured as a separate IE in the message exchanged between CN node and RAN node or between two RAN nodes or in the PDU Session Resource Setup Request Transfer container, PDU Session Resource Setup Response Transfer container, PDU Session Resource Setup Unsuccessful Transfer container, PDU Session Resource Modify Request Transfer container, the PDU Session Resource Modify Response Transfer container, the Handover Required Transfer container, the Handover Command Transfer container, the Handover Request Acknowledge Transfer container, the Handover Resource Allocation Unsuccessful Transfer container, the Path Switch Request Transfer container, the Path Switch Request Acknowledge Transfer container, the Path Switch Request Setup Failed Transfer container, and/or the Path Switch Request Unsuccessful Transfer container.

As a third alternative, the slice assistance information can include indicators including any of an allowed target NW slice or equivalent slice for each PDU session. The allowed target NW slice or equivalent per PDU session will be configured as a separate IE in the message exchanged between CN node and RAN node or between two RAN nodes or in the PDU Session Resource Setup Request Transfer container, PDU Session Resource Setup Response Transfer container, PDU Session Resource Setup Unsuccessful Transfer container, PDU Session Resource Modify Request Transfer container, the PDU Session Resource Modify Response Transfer container, the Handover Required Transfer container, the Handover Command Transfer container, the Handover Request Acknowledge Transfer container, the Handover Resource Allocation Unsuccessful Transfer container, the Path Switch Request Transfer container, the Path Switch Request Acknowledge Transfer container, the Path Switch Request Setup Failed Transfer container or the Path Switch Request Unsuccessful Transfer container.

The allowed target NW slice for each serving NW slice (current NW slice), or Equivalent NW slice, among which the slice re-mapping may be allowed. This can be configured either by a separate list (e.g., a list of S-NSSAI for which the re-mapping operation is applicable and the target or equivalent NW slice(s) for each slice in the list), or as part of AllowedNSSAI (e.g. the allowed re-mapping slice or equivalent slice can be included in AllowedNSSAI-Item), or as a part of Slice Support List-Item. A Potential QoS profile may be included for each QoS flow in a target NW slice or equivalent NW slice.

As a fourth alternative, the slice assistance information can include a cause value (e.g., slice remapping not allowed) for handover failure, handover cancel, or handover preparation failure.

Issue 2

A second issue may relate to when the slice assistance information is provided from a second network node to a first network node. The slice assistance information can be provided from a CN node to a RAN node, from one RAN node to another RAN node, or from a RAN node to a CN node via one of various messages.

One such message can include an initial context setup request message from CN to RAN. The slice assistance information can be included as a separate IE or included in the PDU Session Resource Setup Request Transfer container in this message.

Another such message can include a PDU session resource modify request message from CN to RAN. The slice assistance information can be included as a separate IE or included in the PDU Session Resource Modify Request Transfer container in this message.

Another such message can include a PDU session resource setup request message from CN to RAN. The slice assistance information can be included as a separate IE or included in the PDU Session Resource Setup Request Transfer in this message.

Another such message can include a handover command message from CN to RAN. The slice assistance information can be included as a separate IE or included in the Handover Command Transfer container in this message.

Another such message can include a handover request message from CN to RAN. The slice assistance information can be included as a separate IE or included in the PDU Session Resource Setup Request Transfer container in this message.

Another such message can include a path switch request acknowledge message from CN to RAN. The slice assistance information can be included as a separate IE or included in the Path Switch Request Acknowledge Transfer container/the Path Switch Request Unsuccessful Transfer in this message.

Another such message can include a path switch request failure message from CN to RAN. The slice assistance information can be included as a separate IE or included in the Path Switch Request Unsuccessful Transfer container in this message.

Another such message can include a UE context modification request message from CN to RAN.

Another such message can include a XN setup response message from a RAN node to another RAN node.

Another such message can include a XN setup request message from a RAN node to another RAN node.

Another such message can include a handover request message from a RAN node to another RAN node.

Another such message can include a handover request acknowledge message from a RAN node to another RAN node.

Another such message can include a handover preparation failure message from a RAN node to another RAN node.

Another such message can include a retrieve UE context request message from a RAN node to another RAN node.

Another such message can include a retrieve UE context response message from a RAN node to another RAN node.

Another such message can include an initial context setup response message from RAN to CN. The slice assistance information can be included as a separate IE or included in the PDU Session Resource Setup Response Transfer container in this message.

Another such message can include an initial context setup failure message from RAN to CN. The slice assistance information can be included as a separate IE or included in the PDU Session Resource Setup Unsuccessful Transfer container in this message.

Another such message can include a PDU session resource setup response message from RAN to CN. The slice assistance information can be included as a separate IE or included in the PDU Session Resource Setup Response Transfer container in this message.

Another such message can include a PDU session resource modify response message from RAN to CN. The slice assistance information can be included as a separate IE or included in the PDU Session Resource Modify Response Transfer container in this message.

Another such message can include a UE context modification response message from RAN to CN.

Another such message can include a handover required message from RAN to CN. The slice assistance information can be included as a separate IE or included in the Handover Required Transfer container in this message.

Another such message can include an initial UE message from RAN to CN.

Another such message can include a handover failure message from RAN to CN.

Another such message can include a handover request acknowledge message from RAN to CN. The slice assistance information can be included as a separate IE or included in the Handover Request Acknowledge Transfer container or Handover Resource Allocation Unsuccessful Transfer container in this message.

Another such message can include a path switch request message from RAN to CN.

The slice assistance information can be included as a separate IE or included in the Path Switch Request Transfer container/Path Switch Request Setup Failed Transfer container in this message.

Issue 3

With respect to a third issue, a first network node may perform one or more of the following operations based on the slice assistance information.

A first operation can include the first node performing NG/S1 based handover. Upon receiving the supported slice information in another RAN node which maybe a candidate node as the handover target, if the current slice using by UE may not be supported by target cell and the slice assistance information (e.g., an indicator) showing that the CN based remapping is supported for the UE, the ongoing PDU session or the serving slice, the source node may initiate the NG/S1 based handover to allow CN to process the slice re-mapping operation.

The source RAN node may initiate NG/S1 based handover by sending handover required message to CN node.

The CN node can then either remap the association between the PDU session and send the remapped slice to the target RAN node via handover request message or remove the concerned PDU session.

During the NG/S1 based handover procedure, the CN node, after receiving the slice assistance information (e.g., the target NW slice or equivalent slice to the serving slice) from a source RAN node via handover required message, perform slice remapping and send the remapped slice (i.e. the new slice assistance information) for each PDU session with slice remapping to the target RAN node via handover request message.

In a second alternative, the first node can perform X2/Xn based handover procedure. Upon receiving the slice remapping assistance information (e.g., the target NW slice or equivalent slice to the serving NW slice) from CN node, the source node initiate the X2/Xn based handover and send the slice re-mapping assistant information to the target node. The target node may process the slice re-mapping with the slice re-mapping assistant information. After the successful completion of handover procedure, the target node can inform CN the remapped slice (i.e., the new slice assistance information) in the Path Switch Request message for each PDU session with slice re-mapping.

The source RAN node may send the slice remapping assistance information to the target RAN node via handover request message.

The target RAN node may send back handover request acknowledge message, in which the admitted PDU sessions and the remapped slice are included, to the source RAN node.

In some embodiments, the source node can check the slice validity in target node before the initialization of X2/Xn handover, taken the slice re-mapping assistant information into account. Upon receiving the slice assistance information (e.g., an indicator showing that the slice remapping is supported) from another RAN node, the source RAN node may initiate the X2/Xn based handover procedure by sending handover request message to the target node. The target node may process the slice remapping and send back a handover request acknowledge message to inform the source node of the remapped slice (i.e. the new slice assistance information) for each PDU session with slice remapping.

In a third alternative, the first network node can perform a UE context retrieve procedure. The source RAN node can initiate the UE context retrieve procedure by sending a retrieve UE context request message, the target RAN node can perform slice remapping and send back retrieve UE context response message, including the slice assistance information (e.g., the target NW slice or equivalent slice to the serving NW slice), to the source RAN node.

The slice assistance information can be generated either by the RAN node, AMF or SMF. For the case when the slice assistance information is generated by SMF, the SMF can transmit the slice assistance information to the AMF to forward it to the RAN node. For the case when the slice assistance information is generated by the RAN node and has to be transmitted to the SMF, the RAN node can transmit the slice assistance information to AMF to forward it to the SMF.

Example Embodiment 1

Figure 4:
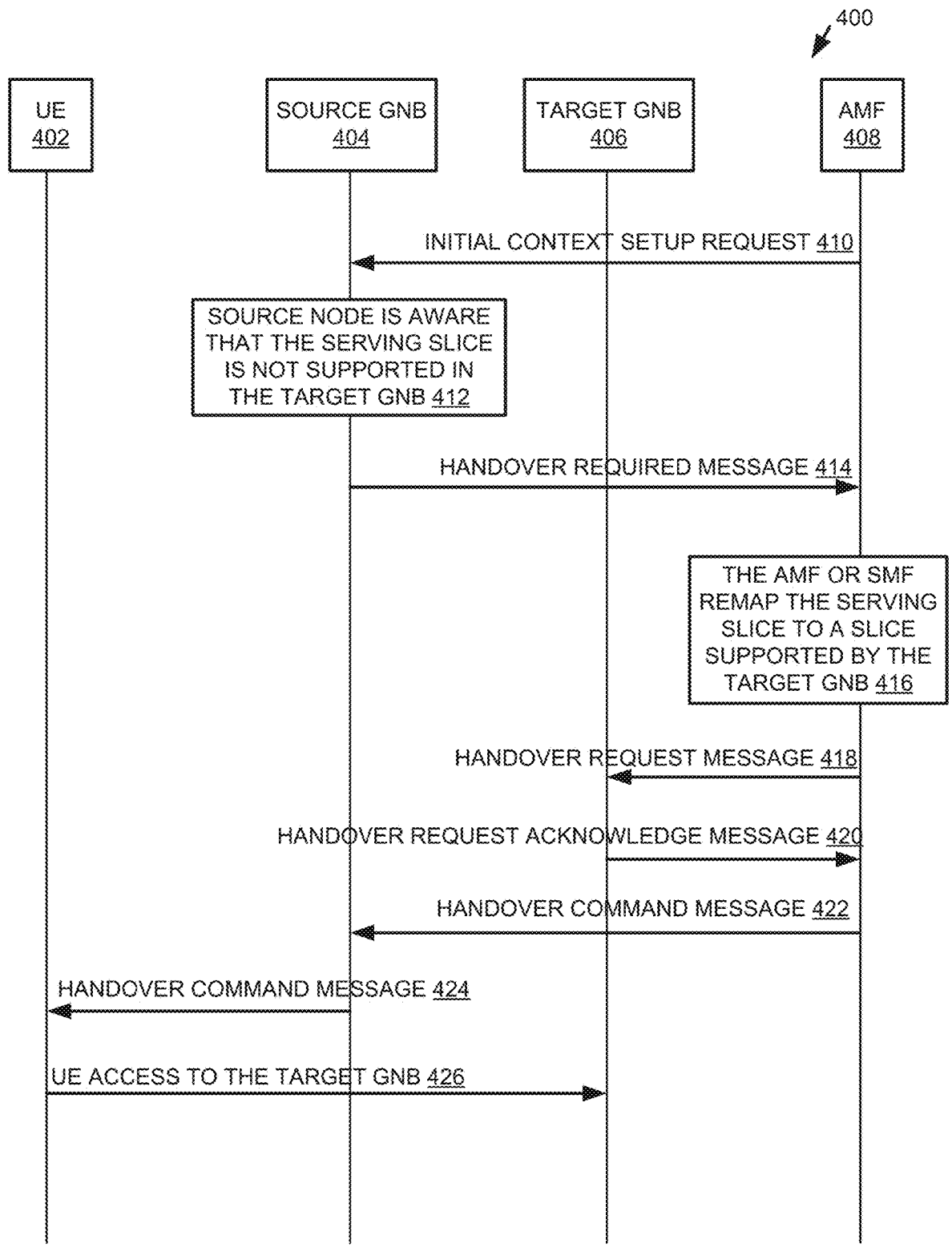
FIG. 4 is an example signaling process illustrating an NG-based handover procedure with slice remapping at the CN side.

A first example embodiment relates to a NG based handover procedure with slice remapping at CN side. FIG. 4 is an example signaling process 400 illustrating an NG-based handover procedure with slice remapping at the CN side. As shown in FIG. 4, the following steps can be performed to ensure service continuity by slice remapping when the serving slice is not supported at the target gNB.

At step 410, the AMF 408 can indicate to the source gNB 404 that the slice remapping at CN side is supported.

At step 412, the source gNB 404 can be aware that the serving slice is not supported at the target gNB thus decided to initiate NG based handover procedure by sending handover required message to the AMF.

At step 414, a handover required message 414 can be sent from source GNB 404 to AMF 408.

At step 416, the AMF or SMF identified that the serving slice is not supported at the target gNB but can be remapped to another slice supported at the target gNB. The AMF or SMF perform slice remapping and send handover request message in which the remapped S-NSSAI is included to request resource preparations at the target gNB.

At step 418, a handover request message can be sent from AMF 408 to target GNB 406.

At step 420, the target gNB reserve resources and send handover request acknowledge message to the AMF.

At step 422, the AMF can send a handover command message to the source gNB to inform that the resources for the handover have been prepared at the target side.

At step 424, the source gNB send Handover command message (e.g., a RRC Reconfiguration message) to UE to provide configuration for accessing the target gNB.

At step 426, the UE 402 can initiate access to the target gNB based on the configuration received.

In step 410, one of the following operations can be performed on how to indicate slice remapping at CN side. A first option can include the indication for supporting slice remapping at CN side is configured per UE in the initial context setup request message.

Initial Context Setup Request

The Initial Context Setup Request message can be sent by the AMF to request the setup of a UE context. A direction can include from AMF to NG-RAN node.

TABLE 1

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.21 | | YES | reject |
| UE Aggregate Maximum Bit Rate | C-ifPDUsessionResourceSetup | | 9.3.1.58 | | YES | reject |
| Core Network Assistance Information for RRC INACTIVE | O | | 9.3.1.15 | | YES | ignore |
| GUAMI | M | | 9.3.3.3 | | YES | reject |
| PDU Session Resource Setup Request List | | 0 . . . 1 | | | YES | reject |
| >PDU Session Resource Setup Request Item | | 1 . . . <maxnoofPDUSessions> | | | — | |
| >>PDU Session ID | M | | 9.3.1.50 | | — | |
| >>PDU Session | O | | NAS-PDU | | | |

TABLE 1-continued

| IE/Group Name | Presence | Range | IE type and reference | Semantics description | Criticality | Assigned Criticality |
|---|---|---|---|---|---|---|
| NAS-PDU | | | 9.3.3.4 | | | |
| >>S-NSSAI | M | | 9.3.1.24 | | — | |
| >>PDU Session Resource Setup Request Transfer | M | | OCTET STRING | Containing the PDU Session Resource Setup Request Transfer IE specified in subclause 9.3.4.1. | — | |
| Allowed NSSAI | M | | 9.3.1.31 | Indicates the S-NSSAIs permitted by the network | YES | reject |
| Slice remapping indicator | O | | 9.3.1.x1 | | YES | ignore |
| UE Security Capabilities | M | | 9.3.1.86 | | YES | reject |
| Security Key | M | | 9.3.1.87 | | YES | reject |
| Trace Activation | O | | 9.3.1.14 | | YES | ignore |
| Mobility Restriction List | O | | 9.3.1.85 | | YES | ignore |
| UE Radio Capability | O | | 9.3.1.74 | | YES | ignore |
| Index to RAT/Frequency Selection Priority | O | | 9.3.1.61 | | YES | ignore |
| Masked IMEISV | O | | 9.3.1.54 | | YES | ignore |
| NAS-PDU | O | | 9.3.3.4 | | YES | ignore |
| Emergency Fallback Indicator | O | | 9.3.1.26 | | YES | reject |
| RRC Inactive Transition Report Request | O | | 9.3.1.91 | | YES | ignore |
| UE Radio Capability for Paging | O | | 9.3.1.68 | | YES | ignore |
| Redirection for Voice EPS Fallback | O | | 9.3.1.116 | | YES | ignore |
| Location Reporting Request Type | O | | 9.3.1.65 | | YES | ignore |
| CN Assisted RAN Parameters Tuning | O | | 9.3.1.119 | | YES | ignore |

Slice Remapping Indicator

A slice remapping indicator IE can indicate to the NG-RAN node that the slice remapping is allowed and can be performed at the network.

TABLE 2

| IE/Group Name | Presence | Range | IE type and reference | Semantics description |
|---|---|---|---|---|
| Slice remapping indicator | O | | ENUMERATED (true, . . . ) | This IE is used to indicate to NG-RAN node that the slice remapping is allowed and can be performed at the network. |

In option 1.2, the indication for slice remapping at CN side may be configured per slice in the INITIAL CONTEXT SETUP REQUEST message. In option 1.2.1, the indicator can be configured for each allowed S-NSSAI.

Initial Context Setup Request

A Initial Context Setup Request message may be sent by the AMF to request the setup of a UE context. A direction can be from AMF to NG-RAN node.

TABLE 3

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.21 | | YES | reject |
| UE Aggregate Maximum Bit Rate | C-ifPDUsessionResourceSetup | | 9.3.1.58 | | YES | reject |
| Core Network Assistance Information for RRC INACTIVE | O | | 9.3.1.15 | | YES | ignore |
| GUAMI | M | | 9.3.3.3 | | YES | reject |
| PDU Session Resource Setup Request List | | 0 . . . 1 | | | YES | reject |
| >PDU Session Resource Setup Request Item | | 1 . . . <maxnoofPDUSessions> | | | — | |
| >>PDU Session ID | M | | 9.3.1.50 | | — | |
| >>PDU Session NAS-PDU | O | | NAS-PDU 9.3.3.4 | | — | |
| >>S-NSSAI | M | | 9.3.1.24 | | — | |
| >>PDU Session Resource Setup Request Transfer | M | | OCTET STRING | Containing the PDU Session Resource Setup Request Transfer IE specified in subclause 9.3.4.1. | — | |
| Allowed NSSAI | M | | 9.3.1.31 | Indicates the S-NSSAIs permitted by the network | YES | reject |

TABLE 3-continued

| IE/Group Name | Presence | Range | IE type and reference | Semantics description | Criticality | Assigned Criticality |
|---|---|---|---|---|---|---|
| UE Security Capabilities | M | | 9.3.1.86 | | YES | reject |
| Security Key | M | | 9.3.1.87 | | YES | reject |
| Trace Activation | O | | 9.3.1.14 | | YES | ignore |
| Mobility Restriction List | O | | 9.3.1.85 | | YES | ignore |
| UE Radio Capability | O | | 9.3.1.74 | | YES | ignore |
| Index to RAT/Frequency Selection Priority | O | | 9.3.1.61 | | YES | ignore |
| Masked IMEISV | O | | 9.3.1.54 | | YES | ignore |
| NAS-PDU | O | | 9.3.3.4 | | YES | ignore |
| Emergency Fallback Indicator | O | | 9.3.1.26 | | YES | reject |
| RRC Inactive Transition Report Request | O | | 9.3.1.91 | | YES | ignore |
| UE Radio Capability for Paging | O | | 9.3.1.68 | | YES | ignore |
| Redirection for Voice EPS Fallback | O | | 9.3.1.116 | | YES | ignore |
| Location Reporting Request Type | O | | 9.3.1.65 | | YES | ignore |
| CN Assisted RAN Parameters Tuning | O | | 9.3.1.119 | | YES | ignore |

Allowed NSSAI

An allowed NSSAI IE may contain the allowed NSSAI.

TABLE 4

| IE/Group Name | Presence | Range | IE type and reference | Semantics description |
|---|---|---|---|---|
| Allowed S-NSSAI List | | 1 | | |
| >Allowed S-NSSAI Item | | 1 ... <maxnoofAllowed S-NSSAIs> | | |
| >>S-NSSAI | M | | 9.3.1.24 | |
| >> Slice remapping indicator | O | | 9.3.1.x2 | |

TABLE 5

| Range bound | Explanation |
|---|---|
| maxnoofAllowed S-NSSAIs | Maximum no. of allowed S-NSSAI. Value is 8. |

Slice Remapping Indicator

A slice remapping indicator IE can indicate to the NG-RAN node that the slice remapping is allowed and can be performed at the network.

TABLE 6

| IE/Group Name | Presence | Range | IE type and reference | Semantics description |
|---|---|---|---|---|
| Slice remapping indicator | O | | ENUMERATED (true, ... ) | This IE is used to indicate to NG-RAN node that the slice remapping is allowed and can be performed at the network. |

In option 1.2.2, a list of S-NSSAI for which the slice remapping is supported can be provided in an initial context setup request message.

TABLE 7

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.21 | | YES | reject |
| UE Aggregate Maximum Bit Rate | C-ifPDUsessionResourceSetup | | 9.3.1.58 | | YES | reject |
| Core Network Assistance Information for RRC INACTIVE | O | | 9.3.1.15 | | YES | ignore |
| GUAMI | M | | 9.3.3.3 | | YES | reject |
| PDU Session Resource Setup Request List | | 0 . . . 1 | | | YES | reject |
| >PDU Session Resource Setup Request Item | | 1 . . . <maxnoofPDUSessions> | | | — | |
| >>PDU Session ID | M | | 9.3.1.50 | | — | |
| >>PDU Session NAS-PDU | O | | NAS-PDU 9.3.3.4 | | — | |
| >>S-NSSAI | M | | 9.3.1.24 | | — | |
| >>PDU Session Resource Setup Request Transfer | M | | OCTET STRING | Containing the PDU Session Resource Setup Request Transfer IE specified in subclause 9.3.4.1. | — | |
| Allowed NSSAI | M | | 9.3.1.31 | Indicates the S-NSSAIs permitted by the network | YES | reject |
| Slice remapping allowed NSSAI | O | | 9.3.1.x3 | Indicates the S-NSSAI for which the slice remapping is allowed and can be performed at network. | YES | ignore |
| UE Security Capabilities | M | | 9.3.1.86 | | YES | reject |
| Security Key | M | | 9.3.1.87 | | YES | reject |
| Trace Activation | O | | 9.3.1.14 | | YES | ignore |
| Mobility Restriction List | O | | 9.3.1.85 | | YES | ignore |
| UE Radio Capability | O | | 9.3.1.74 | | YES | ignore |

TABLE 7-continued

| IE/Group Name | Presence | Range | IE type and reference | Semantics description | Criticality | Assigned Criticality |
|---|---|---|---|---|---|---|
| Index to RAT/Frequency Selection Priority | O | | 9.3.1.61 | | YES | ignore |
| Masked IMEISV | O | | 9.3.1.54 | | YES | ignore |
| NAS-PDU | O | | 9.3.3.4 | | YES | ignore |
| Emergency Fallback Indicator | O | | 9.3.1.26 | | YES | reject |
| RRC Inactive Transition Report Request | O | | 9.3.1.91 | | YES | ignore |
| UE Radio Capability for Paging | O | | 9.3.1.68 | | YES | ignore |
| Redirection for Voice EPS Fallback | O | | 9.3.1.116 | | YES | ignore |
| Location Reporting Request Type | O | | 9.3.1.65 | | YES | ignore |
| CN Assisted RAN Parameters Tuning | O | | 9.3.1.119 | | YES | ignore |

Slice Remapping Allowed NSSAI

A slice remapping allowed NSSAI IE can contain the S-NSSAI for which the slice remapping is allowed and can be performed at network.

TABLE 8

| IE/Group Name | Presence | Range | IE type and reference | Semantics description |
|---|---|---|---|---|
| Slice remapping allowed S-NSSAI List | | 1 | | |
| >Slice remapping allowed S-NSSAI Item | | 1 . . . <maxnoofSliceRemappingAllowedS-NSSAIs> | | |
| >>S-NSSAI | M | | 9.3.1.24 | |

TABLE 9

| Range bound | Explanation |
|---|---|
| maxnoofSliceRemappingAllowedS-NSSAIs | Maximum no. of S-NSSAI for which the slice remapping is allowed. Value is 8. |

In option 1.3, the indication for slice remapping at CN side can be configured per PDU session in the initial context setup request message.

Initial Context Setup Request

An initial context setup request message may be sent by the AMF to request the setup of a UE context. A direction can be from AMF to NG-RAN node.

TABLE 10

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.21 | | YES | reject |
| UE Aggregate Maximum Bit Rate | C-ifPDUsessionResourceSetup | | 9.3.1.58 | | YES | reject |
| Core Network Assistance Information for RRC INACTIVE | O | | 9.3.1.15 | | YES | ignore |
| GUAMI | M | | 9.3.3.3 | | YES | reject |
| PDU Session Resource Setup Request List | | 0 . . . 1 | | | YES | reject |
| >PDU Session Resource Setup Request Item | | 1 . . . <maxnoofPDUSessions> | | | — | |
| >>PDU Session ID | M | | 9.3.1.50 | | — | |
| >>PDU Session NAS-PDU | O | | NAS-PDU 9.3.3.4 | | — | |
| >>S-NSSAI | M | | 9.3.1.24 | | — | |
| >>Slice remapping indicator | O | | 9.3.1.x4 | | YES | ignore |
| >>PDU Session Resource Setup Request Transfer | M | | OCTET STRING | Containing the PDU Session Resource Setup Request Transfer IE specified in subclause 9.3.4.1. | — | |
| Allowed NSSAI | M | | 9.3.1.31 | Indicates the S-NSSAIs permitted by the network | YES | reject |
| UE Security Capabilities | M | | 9.3.1.86 | | YES | reject |
| Security Key | M | | 9.3.1.87 | | YES | reject |
| Trace Activation | O | | 9.3.1.14 | | YES | ignore |
| Mobility Restriction List | O | | 9.3.1.85 | | YES | ignore |
| UE Radio Capability | O | | 9.3.1.74 | | YES | ignore |
| Index to RAT/Frequency Selection Priority | O | | 9.3.1.61 | | YES | ignore |
| Masked IMEISV | O | | 9.3.1.54 | | YES | ignore |

TABLE 10-continued

| IE/Group Name | Presence | Range | IE type and reference | Semantics description | Criticality | Assigned Criticality |
|---|---|---|---|---|---|---|
| NAS-PDU | O | | 9.3.3.4 | | YES | ignore |
| Emergency Fallback Indicator | O | | 9.3.1.26 | | YES | reject |
| RRC Inactive Transition Report Request | O | | 9.3.1.91 | | YES | ignore |
| UE Radio Capability for Paging | O | | 9.3.1.68 | | YES | ignore |
| Redirection for Voice EPS Fallback | O | | 9.3.1.116 | | YES | ignore |
| Location Reporting Request Type | O | | 9.3.1.65 | | YES | ignore |
| CN Assisted RAN Parameters Tuning | O | | 9.3.1.119 | | YES | ignore |

9.3.1.x4 Slice Remapping Indicator

This IE indicates to the NG-RAN node that the slice remapping is allowed and can be performed at the network.

TABLE 11

| IE/Group Name | Presence | Range | IE type and reference | Semantics description |
|---|---|---|---|---|
| Slice remapping indicator | O | | ENUMERATED (true, . . . ) | This IE is used to indicate to NG-RAN node that the slice remapping is allowed and can be performed at the network. |

Example Embodiment 2

Figure 5:
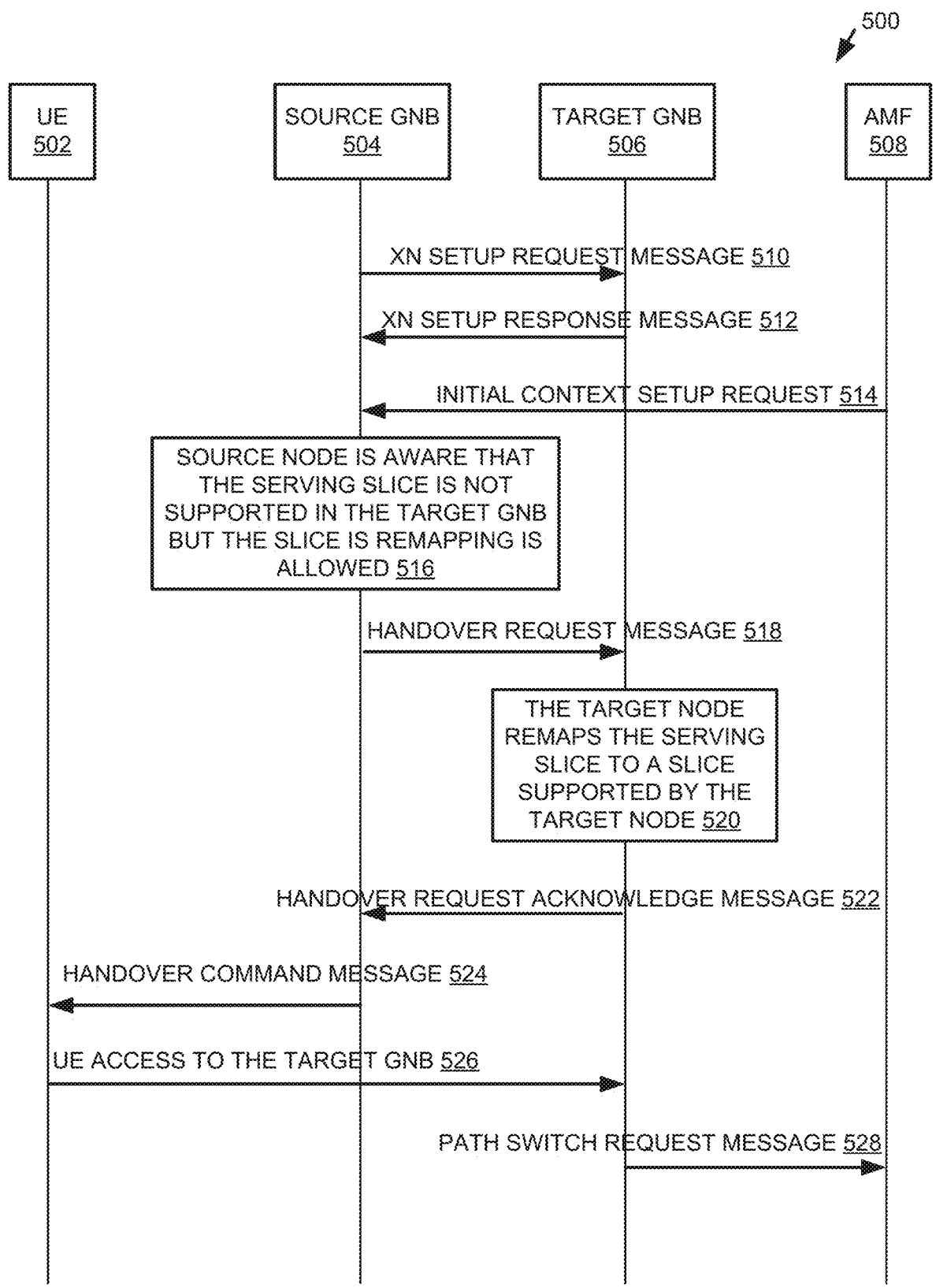
FIG. 5 is an example signaling process illustrating an Xn based handover with slice remapping at the RAN side.

A second example embodiment relates to a Xn based handover procedure with slice remapping at the RAN side. FIG. 5 is an example signaling process 500 illustrating an Xn based handover with slice remapping at the RAN side. As shown in FIG. 5, the following steps can be performed to ensure service continuity by slice remapping when the serving slice is not supported at the target gNB.

In step 510, the source gNB 504 can transmit the XN setup request message to the target gNB 506 to setup the Xn interface.

In step 512, the target gNB can send back the XN setup response message, in which the indicator shows that the slice remapping is supported, to the source gNB.

In step 514, the AMF 508 can send the initial context setup request message, in which the slice remapping assistance information (e.g., equivalent S-NSSAIs to certain S-NSSAIs) is included, to the source gNB. The slice remapping assistance information (e.g. equivalent S-NSSAIs to certain S-NSSAIs) can be generated by AMF or SMF. For the case when the slice remapping information is generated by the SMF, the SMF send the slice remapping information to AMF to forward it to the RAN node.

In step 516, the source gNB can be aware that the serving slice is not supported by the target gNB but the slice remapping is supported at the target side. The source gNB then initiates handover procedure by sending HANDOVER REQUEST message (including the serving slice and the slice remapping assistance information) to the target gNB.

In step 518, the source gNB can send a HANDOVER REQUEST to the target node in which the serving slice and the slice remapping assistance information is included.

In step 520, the target gNB can remap the serving slice to another slice supported in the target gNB based on the slice assistance information.

In step 522, target gNB can send back the handover request acknowledge message after preparation of the handover resource.

In step 524, the source gNB can send a handover command message (e.g. RRCReconfiguration message) to the UE to provide configuration for accessing the gNB.

In step 526, the UE can initiate access to the target gNB based on the configuration received.

In step 528, the target gNB can send back the remapped slice information to the AMF via PATH SWITCH REQUEST message. The AMF may forward the remapped slice information to the SMF.

In step 512, one of the following options may be performed on how to indicate the slice remapping at RAN side.

Indication of Support of Slice Remapping at RAN Side

In option 2.1.1, the indication for supporting slice remapping at RAN side may be configured per UE in the XN SETUP RESPONSE message.

XN Setup Response

This message can be sent by a NG-RAN node to a neighboring NG-RAN node to transfer application data for an Xn-C interface instance. A direction can include NG-RAN node 2 to NG-RAN node 1.

Direction: From NG-RAN node2 to NG-RAN node1.

TABLE 12

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |
| Slice remapping indicator | O | | 9.2.3.y1 | | YES | ignore |
| List of Served Cells NR | | 0 . . . <maxnoofCellsinNG-RAN node> | | Contains a list of cells served by the gNB. If a partial list of cells is signalled, it contains at least one cell per carrier configured at the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| >Partial List Indicator | O | | ENUMERATED (partial, . . .) | Value "partial" indicates that a partial list of cells is included in the List of Served Cells NR IE | YES | ignore |
| >Cell and Capacity Assistance Information | O | | 9.2.2.41 | | YES | ignore |
| List of Served Cells E-UTRA | | 0 . . . <maxnoofCellsinNG-RAN node> | | Contains a list of cells served by the ng-eNB. If a partial list of cells is signalled, it contains at least one cell per carrier configured at the gNB | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| >Partial List Indicator | O | | ENUMERATED (partial, . . .) | Value "partial" indicates that a partial list of cells is included in the List of Served Cells E-UTRA IE | YES | ignore |
| >Cell and Capacity Assistance Information | O | | 9.2.2.41 | | YES | ignore |

TABLE 12-continued

| IE/Group Name | Presence | Range | IE type and reference | Semantics description | Criticality | Assigned Criticality |
|---|---|---|---|---|---|---|
| Criticality Diagnostics | O | | 9.2.3.3 | | YES | ignore |
| AMF Region Information | O | | 9.2.3.83 | Contains a list of all the AMF Regions to which the NG-RAN node belongs. | YES | reject |
| Interface Instance Indication | O | | 9.2.2.39 | | YES | reject |
| TNL Configuration Info | O | | 9.2.3.96 | | YES | ignore |

Slice Remapping Indicator

This IE can indicate to the NG-RAN node that the slice remapping is allowed and can be performed at the network.

| IE/Group Name | Presence | Range | IE type and reference | Semantics description |
|---|---|---|---|---|
| Slice remapping indicator | O | | ENUMERATED (true, . . . ) | This IE is used to indicate to NG-RAN node that the slice remapping is allowed and can be performed at the network. |

In option 2.1.2, the indication for supporting slice remapping at RAN side can be configured per slice in the XN SETUP RESPONSE message. In option 2.1.2.1, The indicator can be configured for each supported S-NSSAI.

XN Setup Response

This message can be sent by a NG-RAN node to a neighboring NG-RAN node to transfer application data for an Xn-C interface instance. A direction can be from NG-RAN node 2 to NG-RAN node 1.

TABLE 13

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |
| List of Served Cells NR | | 0 . . . <maxnoofCellsinNG-RAN node> | | Contains a list of cells served by the gNB. If a partial list of cells is signalled, it contains at least one cell per carrier configured at the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |

TABLE 13-continued

| IE/Group Name | Presence | Range | IE type and reference | Semantics description | Criticality | Assigned Criticality |
|---|---|---|---|---|---|---|
| >Partial List Indicator | O | | ENUMERATED (partial, . . .) | Value "partial" indicates that a partial list of cells is included in the List of Served Cells NR IE | YES | ignore |
| >Cell and Capacity Assistance Information | O | | 9.2.2.41 | | YES | ignore |
| List of Served Cells E-UTRA | | 0 . . . <maxnoofCellsinNG-RAN node> | | Contains a list of cells served by the ng-eNB. If a partial list of cells is signalled, it contains at least one cell per carrier configured at the gNB | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| >Partial List Indicator | O | | ENUMERATED (partial, . . .) | Value "partial" indicates that a partial list of cells is included in the List of Served Cells E-UTRA IE | YES | ignore |
| >Cell and Capacity Assistance Information | O | | 9.2.2.41 | | YES | ignore |
| Criticality Diagnostics | O | | 9.2.3.3 | | YES | ignore |
| AMF Region Information | O | | 9.2.3.83 | Contains a list of all the AMF Regions to which the NG-RAN node belongs. | YES | reject |
| Interface Instance Indication | O | | 9.2.2.39 | | YES | reject |
| TNL Configuration Info | O | | 9.2.3.96 | | YES | ignore |

TAI Support List

A TAI support list IE can indicate the list of TAIs supported by NG-RAN node and associated characteristics e.g. supported slices.

TABLE 14

| IE/Group Name | Presence | Range | IE type and reference | Semantics description |
|---|---|---|---|---|
| TAI Support Item | | 1 . . . <maxnoofsupportedTACs> | | |
| >TAC | M | | 9.2.2.5 | Broadcast TAC |
| >Broadcast PLMNs | | 1 . . . <maxnoofsupportedPLMNs> | | |

TABLE 14-continued

| IE/Group Name | Presence | Range | IE type and reference | Semantics description |
|---|---|---|---|---|
| >>PLMN Identity | M | | 9.2.2.4 | Broadcast PLMN |
| >>TAI Slice Support List | M | | Slice Support List 9.2.3.22 | Supported S-NSSAIs per TA |

Slice Support List

A Slice Support list IE can indicate the list of supported slices.

TABLE 15

| IE/Group Name | Presence | Range | IE type and reference | Semantics description |
|---|---|---|---|---|
| Slice Support Item | | 1 . . . <maxnoofSliceItems> | | |
| >S-NSSAI | M | | 9.2.3.21 | |
| >S-NSSAI remapping indicator | O | | 9.2.3.y2 | |

Slice Remapping Indicator

A slice remapping indicator IE can indicate to the NG-RAN node that the slice remapping is allowed and can be performed at the network.

TABLE 16

| IE/Group Name | Presence | Range | IE type and reference | Semantics description |
|---|---|---|---|---|
| Slice remapping indicator | O | | ENUMERATED (true, . . . ) | This IE is used to indicate to NG-RAN node that the slice remapping is allowed and can be performed at the network. |

In option 2.1.2.2, a list of S-NSSAI for which the slice remapping is supported at RAN side is provided in XN SETUP RESPONSE message.

XN Setup Response

A XN setup response message can be sent by a NG-RAN node to a neighboring NG-RAN node to transfer application data for an Xn-C interface instance. A direction can be from NG-RAN node 2 to NG-RAN node 1.

TABLE 17

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |
| Slice remapping allowed NSSAI | O | | 9.2.3.y3 | Indicates the S-NSSAI for which the slice remapping is allowed and can be performed at network. | YES | ignore |
| List of Served Cells NR | | 0 . . . <maxnoofCellsinNG-RAN node> | | Contains a list of cells served by the gNB. If a partial list of cells is signalled, it contains at least one cell per carrier configured at the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |

TABLE 17-continued

| IE/Group Name | Presence | Range | IE type and reference | Semantics description | Criticality | Assigned Criticality |
|---|---|---|---|---|---|---|
| >Partial List Indicator | O | | ENUMERATED (partial, . . .) | Value "partial" indicates that a partial list of cells is included in the List of Served Cells NR IE | YES | ignore |
| >Cell and Capacity Assistance Information | O | | 9.2.2.41 | | YES | ignore |
| List of Served Cells E-UTRA | | 0 . . . <maxnoofCellsinNG-RAN node> | | Contains a list of cells served by the ng-eNB. If a partial list of cells is signalled, it contains at least one cell per carrier configured at the gNB | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| >Partial List Indicator | O | | ENUMERATED (partial, . . .) | Value "partial" indicates that a partial list of cells is included in the List of Served Cells E-UTRA IE | YES | ignore |
| >Cell and Capacity Assistance Information | O | | 9.2.2.41 | | YES | ignore |
| Criticality Diagnostics | O | | 9.2.3.3 | | YES | ignore |
| AMF Region Information | O | | 9.2.3.83 | Contains a list of all the AMF Regions to which the NG-RAN node belongs. | YES | reject |
| Interface Instance Indication | O | | 9.2.2.39 | | YES | reject |
| TNL Configuration Info | O | | 9.2.3.96 | | YES | ignore |

Slice Remapping Allowed NSSAI

A Slice remapping allowed NSSAI IE can contain the S-NSSAI for which the slice remapping is allowed and can be performed at network.

TABLE 18

| IE/Group Name | Presence | Range | IE type and reference | Semantics description |
|---|---|---|---|---|
| Slice remapping allowed S-NSSAI List | 1 | | | |
| >Slice remapping allowed S-NSSAI Item | | 1 . . . <maxnoofSliceRemappingAllowedS-NSSAIs> | | |
| >>S-NSSAI | M | | 9.2.3.21 | |

TABLE 19

| Range bound | Explanation |
|---|---|
| maxnoofSliceRemappingAllowedS-NSSAIs | Maximum no. of S-NSSAI for which the slice remapping is allowed. Value is 8. |

In step 514, one of the following options may be performed to send the Slice Remapping Assistance Information from CN to RAN.

In option 2.2.1, the equivalent slice information can be included as a separate IE per PDU session in the initial context setup request message.

Initial Context Setup Request

This message can be sent by the AMF to request the setup of a UE context. A direction can be from AMF to NG-RAN node.

TABLE 20

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.21 | | YES | reject |
| UE Aggregate Maximum Bit Rate | C-ifPDUsessionResourceSetup | | 9.3.1.58 | | YES | reject |
| Core Network Assistance Information for RRC INACTIVE | O | | 9.3.1.15 | | YES | ignore |
| GUAMI | M | | 9.3.3.3 | | YES | reject |
| PDU Session Resource Setup Request List | | 0 . . . 1 | | | YES | reject |
| >PDU Session Resource Setup Request Item | | 1 . . . <maxnoofPDUSessions> | | | — | |
| >>PDU Session ID | M | | 9.3.1.50 | | — | |
| >>PDU Session NAS-PDU | O | | NAS-PDU 9.3.3.4 | | — | |
| >>S-NSSAI | M | | 9.3.1.24 | | — | |

TABLE 20-continued

| IE/Group Name | Presence | Range | IE type and reference | Semantics description | Criticality | Assigned Criticality |
|---|---|---|---|---|---|---|
| >>Equivalent S-NSSAI | O | | 9.3.1.a1 | Indicates the equivalent S-NSSAIs. | — | |
| >>PDU Session Resource Setup Request Transfer | M | | OCTET STRING | Containing the PDU Session Resource Setup Request Transfer IE specified in subclause 9.3.4.1. | — | |
| Allowed NSSAI | M | | 9.3.1.31 | Indicates the S-NSSAIs permitted by the network | YES | reject |
| UE Security Capabilities | M | | 9.3.1.86 | | YES | reject |
| Security Key | M | | 9.3.1.87 | | YES | reject |
| Trace Activation | O | | 9.3.1.14 | | YES | ignore |
| Mobility Restriction List | O | | 9.3.1.85 | | YES | ignore |
| UE Radio Capability | O | | 9.3.1.74 | | YES | ignore |
| Index to RAT/ Frequency Selection Priority | O | | 9.3.1.61 | | YES | ignore |
| Masked IMEISV | O | | 9.3.1.54 | | YES | ignore |
| NAS-PDU | O | | 9.3.3.4 | | YES | ignore |
| Emergency Fallback Indicator | O | | 9.3.1.26 | | YES | reject |
| RRC Inactive Transition Report Request | O | | 9.3.1.91 | | YES | ignore |
| UE Radio Capability for Paging | O | | 9.3.1.68 | | YES | ignore |
| Redirection for Voice EPS Fallback | O | | 9.3.1.116 | | YES | ignore |
| Location Reporting Request Type | O | | 9.3.1.65 | | YES | ignore |
| CN Assisted RAN Parameters Tuning | O | | 9.3.1.119 | | YES | ignore |

Equivalent S-NSSAI

The Equivalent S-NSSAI IE can contain the equivalent NSSAI.

TABLE 21

| IE/Group Name | Presence | Range | IE type and reference | Semantics description |
|---|---|---|---|---|
| Equivalent S-NSSAI List | | 1 | | |
| >Equivalent S-NSSAI Item | | 1 ... <maxnoofEquivalentS-NSSAIs> | | |
| >>S-NSSAI | M | | 9.3.1.24 | |
| >>QoS Flow Setup Request List | O | | 9.3.1 b1 | |

TABLE 22

| Range bound | Explanation |
|---|---|
| maxnoofEquivalentS-NSSAIs | Maximum no. of equivalent S-NSSAI. Value is 8. |

QoS Flow Setup Request List

TABLE 23

| IE/Group Name | Presence | Range | IE type and reference | Semantics description |
|---|---|---|---|---|
| QoS Flow Setup Request List | | 1 | | |
| >QoS Flow Setup Request Item | | 1 ... <maxnoofQoSFlows> | | |
| >>QoS Flow Identifier | M | | 9.3.1.51 | |
| >>QoS Flow Level QoS Parameters | M | | 9.3.1.12 | |
| >>E-RAB ID | Q | | 9.3.2.3 | |

In option 2.2.2, the equivalent slice information may be included in the PDU Session Resource Setup Request Transfer container in the initial context setup request message. In this case, the equivalent slice information can be generated by the SMF and transmitted to AMF so that AMF will forward it to the RAN node.

PDU Session Resource Setup Request Transfer

This IE may be transparent to the AMF.

TABLE 24

| IE/Group Name | Presence | Range | IE type and reference | Semantics description | Criticality | Assigned Criticality |
|---|---|---|---|---|---|---|
| PDU Session Aggregate Maximum Bit Rate | O | | 9.3.1.102 | This IE shall be present when at least one Non-GBR QoS flow is being setup and is ignored otherwise. | YES | reject |
| UL NG-U UP TNL Information | M | | UP Transport Layer Information 9.3.2.2 | UPF endpoint of the NG-U transport bearer, for delivery of ULPDUs. | YES | reject |

TABLE 24-continued

| IE/Group Name | Presence | Range | IE type and reference | Semantics description | Criticality | Assigned Criticality |
|---|---|---|---|---|---|---|
| Additional UL NG-U UP TNL Information | O | | UP Transport Layer Information List 9.3.2.12 | UPF endpoint of the additional NG-U transport bearer(s), for delivery of UL PDUs for split PDU session. | YES | reject |
| Data Forwarding Not Possible | O | | 9.3.1.63 | This IE may be present in case of HANDOVER REQUEST message and is ignored otherwise. | YES | reject |
| PDU Session Type | M | | 9.3.1.52 | | YES | reject |
| Security Indication | O | | 9.3.1.27 | | YES | reject |
| Network Instance | O | | 9.3.1.113 | This IE is ignored if the Common Network Instance IE is included. | YES | reject |
| QoS Flow Setup Request List | | 1 | | | YES | reject |
| >QoS Flow Setup Request Item | | 1 . . . <maxnoofQoSFlows> | | | — | |
| >>QoS Flow Identifier | M | | 9.3.1.51 | | — | |
| >>QoS Flow Level QoS Parameters | M | | 9.3.1.12 | | — | |
| >>E-RAB ID | O | | 9.3.2.3 | | — | |
| Common Network Instance | O | | 9.3.1.120 | | YES | ignore |
| Direct Forwarding Path Availability | O | | 9.3.1.64 | This IE may be present in case of inter-system handover and shall be ignored otherwise. | YES | ignore |
| Equivalent S-NSSAI | O | | 9.3.1.a2 | Indicates the equivalent S-NSSAIs. | — | |

Equivalent S-NSSAI
　This IE may contain the equivalent NSSAI.

TABLE 25

| IE/Group Name | Presence | Range | IE type and reference | Semantics description |
|---|---|---|---|---|
| Equivalent S-NSSAI List | | 1 | | |

TABLE 25-continued

| IE/Group Name | Presence | Range | IE type and reference | Semantics description |
|---|---|---|---|---|
| >Equivalent S-NSSAI Item | | 1 ... <maxnoofEquivalentS-NSSAIs> | | |
| >>S-NSSAI | M | | 9.3.1.24 | |
| >>QoS Flow Setup Request List | O | | 9.3.1.b2 | |

TABLE 26

| Range bound | Explanation |
|---|---|
| maxnoofEquivalentS-NSSAIs | Maximum no. of equivalent S-NSSAI. Value is 8. |

QoS Flow Setup Request List

TABLE 27

| IE/Group Name | Presence | Range | IE type and reference | Semantics description |
|---|---|---|---|---|
| QoS Flow Setup Request List | 1 | | | |
| >QoS Flow Setup Request Item | | 1 ... <maxnoofQoSFlows> | | |
| >>QoS Flow Identifier | M | | 9.3.1.51 | |
| >>QoSFlow Level QoS Parameters | M | | 9.3.1.12 | |
| >>E-RAB ID | O | | 9.3.2.3 | |

In option 2.2.3, the equivalent slice information may be included per UE as a separate IE in the initial context setup request message.

Initial Context Setup Request

This message can be sent by the AMF to request the setup of a UE context. A direction can be from AMF to NG-RAN node.

TABLE 28

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.21 | | YES | reject |
| UE Aggregate Maximum Bit Rate | C-ifPDUsessionResourceSetup | | 9.3.1.58 | | YES | reject |
| Core Network Assistance Information for RRC INACTIVE | O | | 9.3.1.15 | | YES | ignore |
| GUAMI | M | | 9.3.3.3 | | YES | reject |
| PDU Session Resource Setup Request List | | 0 ... 1 | | | YES | reject |

TABLE 28-continued

| IE/Group Name | Presence | Range | IE type and reference | Semantics description | Criticality | Assigned Criticality |
|---|---|---|---|---|---|---|
| >PDU Session Resource Setup Request Item | | 1 . . . <maxnoofPDUSessions> | | | — | |
| >>PDU Session ID | M | | 9.3.1.50 | | — | |
| >>PDU Session NAS-PDU | O | | NAS-PDU 9.3.3.4 | | — | |
| >>S-NSSAI | M | | 9.3.1.24 | | — | |
| >>PDU Session Resource Setup Request Transfer | M | | OCTET STRING | Containing the PDU Session Resource Setup Request Transfer IE specified in subclause 9.3.4.1. | — | |
| Allowed NSSAI | M | | 9.3.1.31 | Indicates the S-NSSAIs permitted by the network | YES | reject |
| Slice remapping assistance information | O | | 9.3.1.a3 | Indicates a list of S-NSSAIs and the equivalent S-NSSAIs for each S-NSSAI in the list | YES | ignore |
| UE Security Capabilities | M | | 9.3.1.86 | | YES | reject |
| Security Key | M | | 9.3.1.87 | | YES | reject |
| Trace Activation | O | | 9.3.1.14 | | YES | ignore |
| Mobility Restriction List | O | | 9.3.1.85 | | YES | ignore |
| UE Radio Capability | O | | 9.3.1.74 | | YES | ignore |
| Index to RAT/ Frequency Selection Priority | O | | 9.3.1.61 | | YES | ignore |
| Masked IMEISV | O | | 9.3.1.54 | | YES | ignore |
| NAS-PDU | O | | 9.3.3.4 | | YES | ignore |
| Emergency Fallback Indicator | O | | 9.3.1.26 | | YES | reject |
| RRC Inactive Transition Report Request | O | | 9.3.1.91 | | YES | ignore |
| UE Radio Capability for Paging | O | | 9.3.1.68 | | YES | ignore |
| Redirection for Voice EPS Fallback | O | | 9.3.1.116 | | YES | ignore |
| Location Reporting Request Type | O | | 9.3.1.65 | | YES | ignore |

TABLE 28-continued

| IE/Group Name | Presence | Range | IE type and reference | Semantics description | Criticality | Assigned Criticality |
|---|---|---|---|---|---|---|
| CN Assisted RAN Parameters Tuning | O | | 9.3.1.119 | | YES | ignore |

Slice Remapping Assistance Information

This IE contains a list of S-NSSAIs and the equivalent S-NSSAIs for each S-NSSAI in the list.

TABLE 29

| IE/Group Name | Presence | Range | IE type and reference | Semantics description |
|---|---|---|---|---|
| S-NSSAI List | | 1 | | |
| >S-NSSAI Item | | 1 . . . <maxnoofS-NSSAIsWithEquivalent> | | |
| >>S-NSSAI | M | | 9.3.1.24 | |
| >>Equivalent S-NSSAI | M | | 9.3.1.b3 | |

TABLE 30

| Range bound | Explanation |
|---|---|
| maxnoofS-NSSAIsWithEquivalent | Maximum no. of S-NSSAI with equivalent. Value is 8. |

Equivalent S-NSSAI

This IE can contain the equivalent NSSAI.

TABLE 31

| IE/Group Name | Presence | Range | IE type and reference | Semantics description |
|---|---|---|---|---|
| Equivalent S-NSSAI List | | 1 | | |
| >Equivalent S-NSSAI Item | | 1 . . . <maxnoofEquivalentS-NSSAIs> | | |
| >>S-NSSAI | M | | 9.3.1.24 | |
| >>QoS Flow Setup Request List | O | | 9.3.1.c3 | |

QoS Flow Setup Request List

TABLE 32

| IE/Group Name | Presence | Range | IE type and reference | Semantics description |
|---|---|---|---|---|
| QoS Flow Setup Request List | | 1 | | |
| >QoS Flow Setup Request Item | | 1 . . . <maxnoofQoSFlows> | | |
| >>QoS Flow Identifier | M | | 9.3.1.51 | |
| >>QoS Flow Level QoS Parameters | M | | 9.3.1.12 | |
| >>E-RAB ID | O | | 9.3.2.3 | |

In option 2.2.4: the equivalent slice information can be included per slice in the initial context setup request message.

Initial Context Setup Request

This message can be sent by the AMF to request the setup of a UE context. A direction can be from AMF to NG-RAN node.

TABLE 33

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.21 | | YES | reject |
| UE Aggregate Maximum Bit Rate | C-ifPDUsessionResourceSetup | | 9.3.1.58 | | YES | reject |
| Core Network Assistance Information for RRC INACTIVE | O | | 9.3.1.15 | | YES | ignore |
| GUAMI | M | | 9.3.3.3 | | YES | reject |
| PDU Session Resource Setup Request List | | 0 . . . 1 | | | YES | reject |
| >PDU Session Resource Setup Request Item | | 1 . . . <maxnoofPDUSessions> | | | — | |
| >>PDU Session ID | M | | 9.3.1.50 | | — | |
| >>PDU Session NAS-PDU | O | | NAS-PDU 9.3.3.4 | | — | |
| >>S-NSSAI | M | | 9.3.1.24 | | — | |
| >>PDU Session Resource Setup Request Transfer | M | | OCTET STRING | Containing the PDU Session Resource Setup Request Transfer IE specified in subclause 9.3.4.1. | — | |
| Allowed NSSAI | M | | 9.3.1.31 | Indicates the S-NSSAIs permitted by the network | YES | reject |
| UE Security Capabilities | M | | 9.3.1.86 | | YES | reject |
| Security Key | M | | 9.3.1.87 | | YES | reject |
| Trace Activation | O | | 9.3.1.14 | | YES | ignore |
| Mobility Restriction List | O | | 9.3.1.85 | | YES | ignore |
| UE Radio Capability | O | | 9.3.1.74 | | YES | ignore |

TABLE 33-continued

| IE/Group Name | Presence | Range | IE type and reference | Semantics description | Criticality | Assigned Criticality |
|---|---|---|---|---|---|---|
| Index to RAT/Frequency Selection Priority | O | | 9.3.1.61 | | YES | ignore |
| Masked IMEISV | O | | 9.3.1.54 | | YES | ignore |
| NAS-PDU | O | | 9.3.3.4 | | YES | ignore |
| Emergency Fallback Indicator | O | | 9.3.1.26 | | YES | reject |
| RRC Inactive Transition Report Request | O | | 9.3.1.91 | | YES | ignore |
| UE Radio Capability for Paging | O | | 9.3.1.68 | | YES | ignore |
| Redirection for Voice EPS Fallback | O | | 9.3.1.116 | | YES | ignore |
| Location Reporting Request Type | O | | 9.3.1.65 | | YES | ignore |
| CN Assisted RAN Parameters Tuning | O | | 9.3.1.119 | | YES | ignore |

Allowed NSSAI

This IE can contain the allowed NSSAI and the equivalent S-NSSAIs for each allowed NSSAI.

TABLE 34

| IE/Group Name | Presence | Range | IE type and reference | Semantics description |
|---|---|---|---|---|
| Allowed S-NSSAI List | | 1 | | |
| >Allowed S-NSSAI Item | | 1 ... <maxnoofAllowedS-NSSAIs> | | |
| >>S-NSSAI | M | | 9.3.1.24 | |
| >>Equivalent S-NSSAI | O | | 9.3.1.a4 | Indicates the equivalent S-NSSAIs. |

TABLE 35

| Range bound | Explanation |
|---|---|
| maxnoofAllowedS-NSSAIs | Maximum no. of allowed S-NSSAI. Value is 8. |

Equivalent S-NSSAI

This IE can contain the equivalent NSSAI.

TABLE 36

| IE/Group Name | Presence | Range | IE type and reference | Semantics description |
|---|---|---|---|---|
| Equivalent S-NSSAI List | | 1 | | |
| >Equivalent S-NSSAI Item | | 1 ... <maxnoofEquivalentS-NSSAIs> | | |
| >>S-NSSAI | M | | 9.3.1.24 | |

TABLE 37

| Range bound | Explanation |
|---|---|
| maxnoofEquivalentS-NSSAIs | Maximum no. of equivalent S-NSSAI. Value is 8. |

In step 518, one of the following options may be performed to send the Slice Remapping Assistance Information Between RAN Nodes.

In option 2.3.1, the equivalent slice information can be included as a separate IE per PDU session in the PDU Session Resources to Be Setup List IE in HANDOVER REQUEST message.

PDU Session Resources to be Setup List

This IE can contain PDU session resource related information used at UE context transfer between NG-RAN nodes.

TABLE 38

| IE/Group Name | Presence | Range | IE type and reference | Semantics description | Criticality | Assigned Criticality |
|---|---|---|---|---|---|---|
| PDU Session Resources To Be Setup List | | 1 | | | — | |
| >PDU Session Resources To Be Setup Item | | 1 ... <maxnoof PDU sessions > | | | — | |
| >>PDU Session ID | M | | 9.2.3.18 | | — | |
| >>S-NSSAI | M | | 9.2.3.21 | | — | |
| >>Equivalent S-NSSAI | O | | 9.2.3.j1 | | — | |
| >>PDU Session Resource Aggregate Maximum Bitrate | O | | PDU Session Aggregate Maximum Bit Rate 9.2.3.69 | This IE shall be present when at least one Non-GBR QoS Flow has been setup. | — | |
| >>UL NG-U UP TNL Information at UPF | M | | UP Transport Layer Information 9.2.3.30 | UPF endpoint of the NG-U transport bearer. For delivery of UL PDUs | — | |
| >>Additional UL NG-U UP TNL Information at UPF List | O | | Additional UP Transport Layer Information 9.2.1.32 | Additional UPF endpoint of the NG-U transport bearer. For delivery of UL PDUs | YES | ignore |
| >>Source DL NG-U TNL Information | O | | UP Transport Layer Information 9.2.3.30 | Indicates the possibility to keep the NG-U GTP-U tunnel termination point at the target NG-RAN node. | — | |
| >>Security Indication | O | | 9.2.3.52 | | — | |
| >>PDU Session Type | M | | 9.2.3.19 | | — | |
| >>Network Instance | O | | 9.2.3.85 | This IE is ignored if the Common Network Instance IE is present. | — | |
| >>QoS Flows To Be Setup List | | 1 | | | — | |

TABLE 38-continued

| IE/Group Name | Presence | Range | IE type and reference | Semantics description | Criticality | Assigned Criticality |
|---|---|---|---|---|---|---|
| >>>QoS Flows To Be Setup Item | | 1 ... <maxnoofQoSFlows> | | | — | |
| >>>>QoS Flow Identifier | M | | 9.2.3.10 | | — | |
| >>>>QoS Flow Level QoS Parameters | M | | 9.2.3.5 | | — | |
| >>>>E-RAB ID | O | | INTEGER (0 ... 15, ...) | | — | |
| >>Data Forwarding and Offloading Info from source NG-RAN node | O | | 9.2.1.17 | | | |
| >> Common Network Instance | O | | 9.2.3.92 | | YES | ignore |

Equivalent S-NSSAI

This IE can contain the equivalent NSSAI.

TABLE 39

| IE/Group Name | Presence | Range | IE type and reference | Semantics description |
|---|---|---|---|---|
| Equivalent S-NSSAI List | | 1 | | |
| >Equivalent S-NSSAI Item | | 1..<maxnoofEquivalentS-NSSAIs> | | |
| >>S-NSSAI | M | | 9.2.3.21 | |
| >>QoS Flow Setup Request List | O | | 9.2.3.k1 | |

TABLE 40

| Range bound | Explanation |
|---|---|
| maxnoofEquivalentS-NSSAIs | Maximum no. of equivalent S-NSSAI. Value is 8. |

QoS Flow Setup Request List

TABLE 41

| IE/Group Name | Presence | Range | IE type and reference | Semantics description |
|---|---|---|---|---|
| QoS Flows To Be Setup List | | 1 | | |
| >QoS Flows To Be Setup Item | | 1 .. <maxnoofQoSFlows> | | |
| >>QoS Flow Identifier | M | | 9.2.3.10 | |
| >>QoS Flow Level QoS Parameters | M | | 9.2.3.5 | |
| >>E-RAB ID | O | | INTEGER (0..15, ...) | |

In option 2.3.2, the equivalent slice information can be included per UE as a separate IE in the HANDOVER REQUEST message.

Handover Request

This message can be sent by the source NG-RAN node to the target NG-RAN node to request the preparation of resources for a handover. A direction can be from source NG-RAN node to target NG-RAN node.

TABLE 42

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID reference | M | | NG-RAN node UE XnAP ID 9.2.3.16 | Allocated at the source NG-RAN node | YES | reject |
| Cause | M | | 9.2.3.2 | | YES | reject |
| Target Cell Global ID | M | | 9.2.3.25 | Includes either an E-UTRA CGI or an NR CGI | YES | reject |
| GUAMI | M | | 9.2.3.24 | | YES | reject |
| UE Context Information | | 1 | | | YES | reject |
| >NG-C UE associated Signalling reference | M | | AMF UE NGAP ID 9.2.3.26 | Allocated at the AMF on the source NG-C connection. | — | |
| Signalling TNL association address at source NG-C side | M | | CP Transport Layer Information 9.2.3.31 | This IE indicates the AMF's IP address of the SCTP association used at the source NG-C interface instance. Note: If no UE TNLA binding exists at the source NG-RAN node, the source NG-RAN node indicates the TNL association address it would have selected if it would have had to create a UE TNLA binding. | — | |
| >UE Security Capabilities | M | | 9.2.3.49 | | — | |
| >AS Security Information | M | | 9.2.3.50 | | — | |
| >Index to RAT/ Frequency Selection Priority | O | | 9.2.3.23 | | — | |
| >UE Aggregate Maximum Bit Rate | M | | 9.2.3.17 | | — | |
| >PDU Session Resources To Be Setup List | | 1 | 9.2.1.1 | Similar to NG-C signalling, containing UL tunnel information per PDU Session Resource; and in addition, the source side QoS flow ⇔ DRB mapping | — | |
| >RRC Context | M | | OCTET STRING | Either includes the HandoverPreparationInformation message as defined in subclause 10.2.2. of TS 36.331 [14], if the target NG-RAN node is an ng-eNB, or the HandoverPreparationInformation message as defined in subclause 11.2.2 of TS 38.331 [10], if the target NG-RAN node is a gNB. | — | |
| >Location Reporting Information | O | | 9.2.3.47 | Includes the necessary parameters for location reporting. | — | |
| >Mobility Restriction List | O | | 9.2.3.53 | | — | |

TABLE 42-continued

| IE/Group Name | Presence | Range | IE type and reference | Semantics description | Criticality | Assigned Criticality |
|---|---|---|---|---|---|---|
| Slice remapping assistance information | O | | 9.2.3.j2 | Indicates a list of S-NSSAIs and the equivalent S-NSSAIs for each S-NSSAI in the list | YES | ignore |
| Trace Activation | O | | 9.2.3.55 | | YES | ignore |
| Masked IMEISV | O | | 9.2.3.32 | | YES | ignore |
| UE History Information | M | | 9.2.3.64 | | YES | ignore |
| UE Context Reference at the S-NG-RAN node | O | | | | YES | ignore |
| >Global NG-RAN Node ID | M | | 9.2.2.3 | | — | |
| >S-NG-RAN node UE XnAP ID | M | | NG-RAN node UE XnAP ID 9.2.3.16 | | — | |

Slice Remapping Assistance Information
This IE can contain a list of S-NSSAIs and the equivalent S-NSSAIs for each S-NSSAI in the list.

TABLE 43

| IE/Group Name | Presence | Range | IE type and reference | Semantics description |
|---|---|---|---|---|
| S-NSSAI List | | 1 | | |
| >S-NSSAI Item | | 1..<maxnoofS-NSSAIsWithEquivalent> | | |
| >>S-NSSAI | M | | 9.3.2.21 | |
| >>Equivalent S-NSSAI | M | | 9.3.1.k2 | |

TABLE 44

| Range bound | Explanation |
|---|---|
| maxnoofS-NSSAIsWithEquivalent | Maximum no. of S-NSSAI with equivalent. Value is 8. |

Equivalent S-NSSAI
This IE can contain the equivalent NSSAI.

TABLE 45

| IE/Group Name | Presence | Range | IE type and reference | Semantics description |
|---|---|---|---|---|
| Equivalent S-NSSAI List | | 1 | | |
| >Equivalent S-NSSAI Item | | 1..<maxnoofEquivalentS-NSSAIs> | | |
| >>S-NSSAI | M | | 9.3.2.21 | |
| >>QoS Flow Setup Request List | O | | 9.3.2.L2 | |

QoS Flow Setup Request List

TABLE 46

| IE/Group Name | Presence | Range | IE type and reference | Semantics description |
|---|---|---|---|---|
| QoS Flows To Be Setup List | | 1 | | |
| >QoS Flows To Be Setup Item | | 1 .. <maxnoofQoSFlows> | | |
| >>QoS Flow Identifier | M | | 9.2.3.10 | |
| >>QoS Flow Level QoS Parameters | M | | 9.2.3.5 | |
| >>E-RAB ID | O | | INTEGER (0..15, . . . ) | |

In step 528, one of the following options may be performed to send the Slice Remapping Assistance Information From RAN To CN.

In option 2.4.1, the remapped slice information can be included per PDU session in the path switch request message.

Path Switch Request

This message can be sent by the NG-RAN node to inform the AMF of the new serving NG-RAN node and to transfer some NG-U DL tunnel termination point(s) to the SMF via the AMF for one or multiple PDU session resources. A direction can be from NG-RAN node to AMF.

TABLE 47

| IE/Group Name | Presence | Range | IE type and reference | Semantics description | Criticality | Assigned Criticality |
|---|---|---|---|---|---|---|
| Message Type | M | | 9.3.1.1 | | YES | reject |
| RAN UE NGAP ID | M | | 9.3.3.2 | | YES | reject |
| Source AMF UE NGAP ID | M | | AMF UE NGAP ID 9.3.3.1 | | YES | reject |
| User Location Information | M | | 9.3.1.16 | | YES | ignore |
| UE Security Capabilities | M | | 9.3.1.86 | | YES | ignore |
| PDU Session Resource to be Switched in Downlink List | | 1 | | | YES | reject |
| >PDU Session Resource to be Switched in Downlink Item | | 1 . . . <maxnoofPDUSessions> | | | — | |
| >>PDU Session ID | M | | 9.3.1.50 | | — | |
| >>Remapped S-NSSAI | O | | 9.3.1.m1 | | — | |
| >>Path Switch Request Transfer | M | | OCTET STRING | Containing the Path Switch Request Transfer IE specified in subclause 9.3.4.8. | — | |
| PDU Session Resource Failed to Setup List | | 0 . . . 1 | | | YES | ignore |
| >PDU Session Resource | | 1 . . . <maxnoofPDUSessions> | | | — | |

TABLE 47-continued

| IE/Group Name | Presence | Range | IE type and reference | Semantics description | Criticality | Assigned Criticality |
|---|---|---|---|---|---|---|
| Failed to Setup Item | | | | | | |
| >>PDU Session ID | M | | 9.3.1.50 | | — | |
| >>Path Switch Request Setup Failed Transfer | M | | OCTET STRING | Containing the Path Switch Request Setup Failed Transfer IE specified in subclause 9.3.4.15. | — | |

Remapped S-NSSAI

This IE can contain the remapped NSSAI.

TABLE 48

| IE/Group Name | Presence | Range | IE type and reference | Semantics description |
|---|---|---|---|---|
| Remapped S-NSSAI List | | 1 | | |
| >Remapped S-NSSAI Item | | 1..<maxnoofRemappedS-NSSAIs> | | |
| >>S-NSSAI | M | | 9.3.1.24 | |
| >>QoS Flow Setup Request List | O | | 9.3.1.n1 | |

TABLE 49

| Range bound | Explanation |
|---|---|
| maxnoofRemappedS-NSSAIs | Maximum no. of Remapped S-NSSAI. Value is 8. |

QoS Flow Setup Request List

TABLE 50

| IE/Group Name | Presence | Range | IE type and reference | Semantics description |
|---|---|---|---|---|
| QoS Flow Setup Request List | | 1 | | |
| >QoS Flow Setup Request Item | | 1..<maxnoofQoSFlows> | | |
| >>QoS Flow Identifier | M | | 9.3.1.51 | |
| >>QoS Flow Level QoS Parameters | M | | 9.3.1.12 | |
| >>E-RAB ID | O | | 9.3.2.3 | |

In option 2.4.2, the remapped slice information can be included per UE in the path switch request message.

Path Switch Request

This message can be sent by the NG-RAN node to inform the AMF of the new serving NG-RAN node and to transfer some NG-U DL tunnel termination point(s) to the SMF via the AMF for one or multiple PDU session resources. A direction can be from NG-RAN node to AMF.

TABLE 51

| IE/Group Name | Presence | Range | IE type and reference | Semantics description | Criticality | Assigned Criticality |
|---|---|---|---|---|---|---|
| Message Type | M | | 9.3.1.1 | | YES | reject |
| RAN UE NGAP ID | M | | 9.3.3.2 | | YES | reject |
| Source AMF UE NGAP ID | M | | AMF UE NGAP ID 9.3.3.1 | | YES | reject |
| User Location Information | M | | 9.3.1.16 | | YES | ignore |
| UE Security Capabilities | M | | 9.3.1.86 | | YES | ignore |
| Slice remapping assistance information | O | | 9.3.1.m2 | Indicates a list of S-NSSAIs and the remapped S-NSSAI for each S-NSSAI in the list | YES | reject |
| PDU Session Resource to be Switched in Downlink List | | 1 | | | YES | reject |
| >PDU Session Resource to be Switched in Downlink Item | | 1 . . . <maxnoofPDUSessions> | | | — | |
| >>PDU Session ID | M | | 9.3.1.50 | | — | |
| >>Path Switch Request Transfer | M | | OCTET STRING | Containing the Path Switch Request Transfer IE specified in subclause 9.3.4.8. | — | |
| PDU Session Resource Failed to Setup List | | 0 . . . 1 | | | YES | ignore |
| >PDU Session Resource Failed to Setup Item | | 1 . . . <maxnoofPDUSessions> | | | — | |
| >>PDU Session ID | M | | 9.3.1.50 | | — | |
| >>Path Switch Request Setup Failed Transfer | M | | OCTET STRING | Containing the Path Switch Request Setup Failed Transfer IE specified in subclause 9.3.4.15. | — | |

Slice Remapping Assistance Information

This IE can contain a list of S-NSSAIs and the equivalent S-NSSAIs for each S-NSSAI in the list.

TABLE 52

| IE/Group Name | Presence | Range | IE type and reference | Semantics description |
|---|---|---|---|---|
| S-NSSAI List | | 1 | | |
| >S-NSSAI Item | | 1..<maxnoofS-NSSAIsWithRemapping> | | |
| >>S-NSSAI | M | | 9.3.1.24 | |
| >>Remapped S-NSSAI | M | | 9.3.1.n2 | |

TABLE 53

| Range bound | Explanation |
|---|---|
| maxnoofS-NSSAIsWithRemapping | Maximum no. of S-NSSAI with remapping. Value is 8. |

Remapped S-NSSAI

This IE can contain the remapped NSSAI.

TABLE 54

| IE/Group Name | Presence | Range | IE type and reference | Semantics description |
|---|---|---|---|---|
| Remapped S-NSSAI List | | 1 | | |
| >Remapped S-NSSAI Item | | 1..<maxnoofRemappedS-NSSAIs> | | |
| >>S-NSSAI | M | | 9.3.1.24 | |
| >>QoS Flow Setup Request List | O | | 9.3.1.o2 | |

QoS Flow Setup Request List

TABLE 55

| IE/Group Name | Presence | Range | IE type and reference | Semantics description |
|---|---|---|---|---|
| QoS Flow Setup Request List | | 1 | | |
| >QoS Flow Setup Request Item | | 1..<maxnoofQoSFlows> | | |
| >>QoS Flow Identifier | M | | 9.3.1.51 | |
| >>QoS Flow Level QoS Parameters | M | | 9.3.1.12 | |
| >>E-RAB ID | O | | 9.3.2.3 | |

As noted above, the RAN node can receive the slice assistance information from the CN node or another RAN node and initiate or perform handover procedure based on the slice assistance information.

Figure 6:
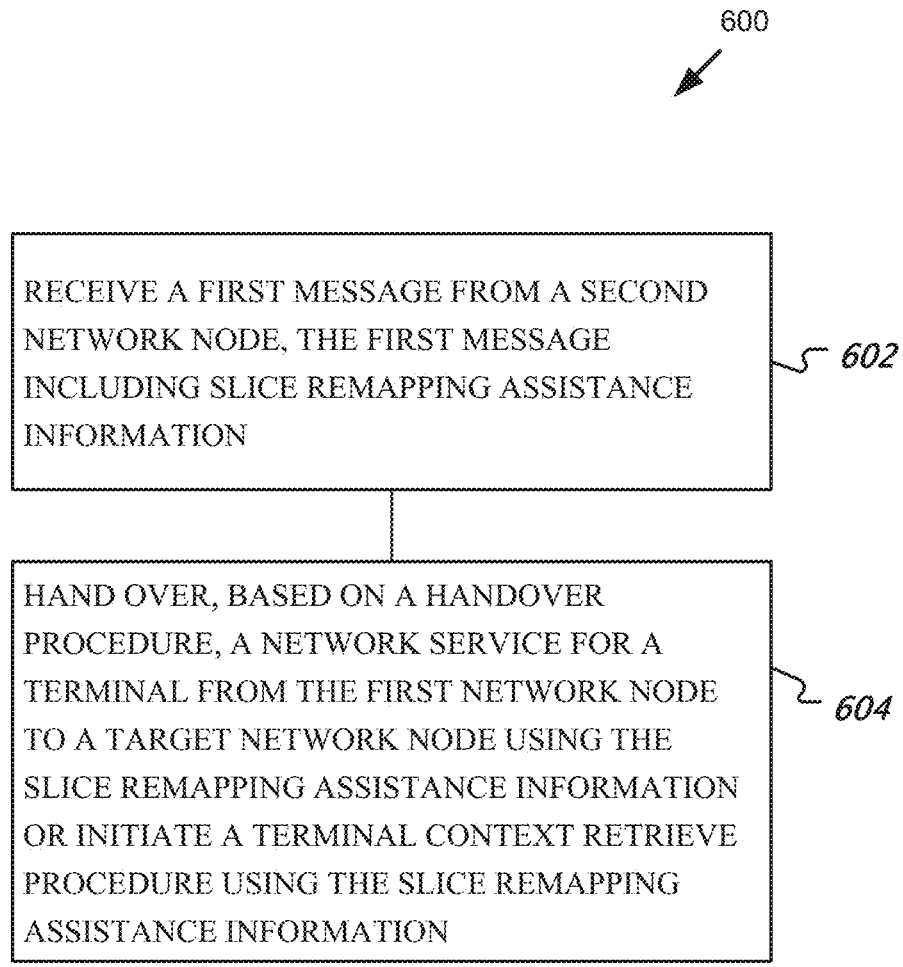
FIG. 6 is an example method for supporting service continuity during a network handover.

FIG. 6 is an example method 600 for supporting service continuity during a network handover. The method can include receiving, by a first network node, a first message from a second network node, the first message including slice remapping assistance information (block 602). The method can also include handing over, based on a handover procedure, a network service for a terminal from the first network node to a target network node using the slice remapping assistance information or initiate a terminal context retrieve procedure using the slice remapping assistance information (block 604).

In some embodiments, the slice remapping assistance information is either generated by the first network or received from a second network node.

In some embodiments, the slice remapping assistance information comprises an indicator indicative of whether network slice remapping is supported by a core network node or a radio access network (RAN) for a specific terminal, a specific network slice, or a specific PDU session.

In some embodiments, the indicator is configured by a separate list, as part of an allowed network slice selection assistance information listing, or as part of a slice support list item.

In some embodiments, the indicator is configured as a separate information element or an information element inside a transparent container in a message containing the information allowing the first network node to perform network remapping.

In some embodiments, the slice remapping assistance information comprises one or more target network slices or equivalent network slices of a network slice for a specific terminal, a specific slice, or a specific Protocol Data Unit (PDU) session.

In some embodiments, the slice remapping assistance information comprises a cause value indicative of a reason that network remapping is not allowed.

In some embodiments, the slice remapping assistance information comprises a quality of service (QoS) profile for each QoS flow in a target network slice or an equivalent network slice.

In some embodiments, any of the first network node and the second network node comprise any of a core network node or a RAN node.

In some embodiments, the slice remapping assistance information is transmitted from the second network node comprising a core network node to the first network node comprising a RAN node via any of: an initial context setup request message, a PDU session resource modify request message, a PDU session resource setup request message, a handover command message, a handover request message, a path switch request acknowledge message, a path switch request failure message, and a terminal context modification request message.

In some embodiments, the information allowing the first network node to perform network remapping is transmitted from the first network node comprising a first RAN node to the second network node comprising a second RAN node via any of: a XN setup response message, a XN setup request message, a handover request message, a handover request acknowledge message, a handover preparation failure message, a retrieve terminal context request message, and a retrieve terminal context response message.

In some embodiments, the slice assistance information is transmitted from a RAN node to a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message.

In some embodiments, performing the handover procedure or retrieving the terminal context procedure further comprises: remapping, by the first network node, a specific network slice to a target network slice or an equivalent network slice.

In some embodiments, the method includes sending, by the first network node, the target network slice or the equivalent network slice to the second network node and/or a third network node.

In some embodiments, the second network node is configured to send the target network slice or equivalent network slice to the third network node.

In some embodiments, the first network node is a first RAN node, the second network node is a second RAN node or a first core network node, and the third node is a second core network node.

In some embodiments, the target network slice or equivalent network slice is sent from the first network node comprising a first RAN node to a second network node comprising a second RAN node via any of a XN setup response message, a XN setup request message, a handover request message, a handover request acknowledge message, a handover preparation failure message, a retrieve terminal context request message, and a retrieve terminal context response message.

In some embodiments, the target network slice or equivalent network slice is sent from the first network node comprising a first RAN node to a second network node comprising a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message.

In some embodiments, the target network slice or equivalent network slice is sent from the first network node comprising a core network node to a second network node comprising a RAN node via any of an initial context setup request message, a PDU session resource modify request message, a PDU session resource setup request message, a handover command message, a handover request message, a path switch request acknowledge message, a path switch request failure message, and a UE context modification request message.

In some embodiments, the method includes initiating, by the first network node, a NG/S1 based handover procedure or a Xn/X2 based handover procedure to the second network node based on the slice remapping assistance information indicating that slice remapping is supported at the second network node.

In some embodiments, the method includes sending, by the first network node, the slice remapping assistance information to a second network node configured to map a serving network slice to a target network slice or an equivalent network slice based on the received slice remapping assistance information.

In some embodiments, the second network node is configured to remap a certain network slice to a target network slice or an equivalent network slice.

In some embodiments, the second network node is configured to send the target network slice or the equivalent network slice to the first network node or a third network node.

In some embodiments, the third network node comprises any of a RAN node or a core network node.

In some embodiments, the target network slice or equivalent network slice is sent from a core network node to a RAN node via any of an initial context setup request message, a PDU session resource modify request message, a PDU session resource setup request message, a handover command message, a handover request message, a path switch request acknowledge message, a path switch request failure message, and a UE context modification request message.

In some embodiments, the target network slice or equivalent network slice is sent from a first RAN node to a second RAN node via any of a XN setup response message, a XN setup request message, a handover request message, a handover request acknowledge message, and a handover preparation failure message.

In some embodiments, the target network slice or equivalent network slice is sent from a RAN node to a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message.

In some embodiments, the method includes initiating, by the first network node, the terminal context retrieve procedure to a second network node based on the slice remapping assistance information indicating that network slice remapping is supported at the second network node.

In some embodiments, the method includes sending, by the first network node, slice remapping assistance information that includes slice assistance information to the second network node configured to map a serving network slice to a target network slice or an equivalent network slice to assist in performing network slice remapping.

In some embodiments, the first network node is a first RAN node and the second network node is a second RAN node.

In some embodiments, the second network node is configured to remap a serving network slice to a target network slice or an equivalent network slice.

In some embodiments, the second network node is configured to send the target network slice or the equivalent network slice to the first network node or a third network node.

In some embodiments, the third network node is a core network node.

In some embodiments, the target network slice or equivalent network slice is sent from a RAN node to a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message.

In some embodiments, the target network slice or equivalent network slice is sent from a first RAN node to a second RAN node via any of a retrieve UE context request message and a retrieve UE context response message.

Example Wireless System

Figure 7:
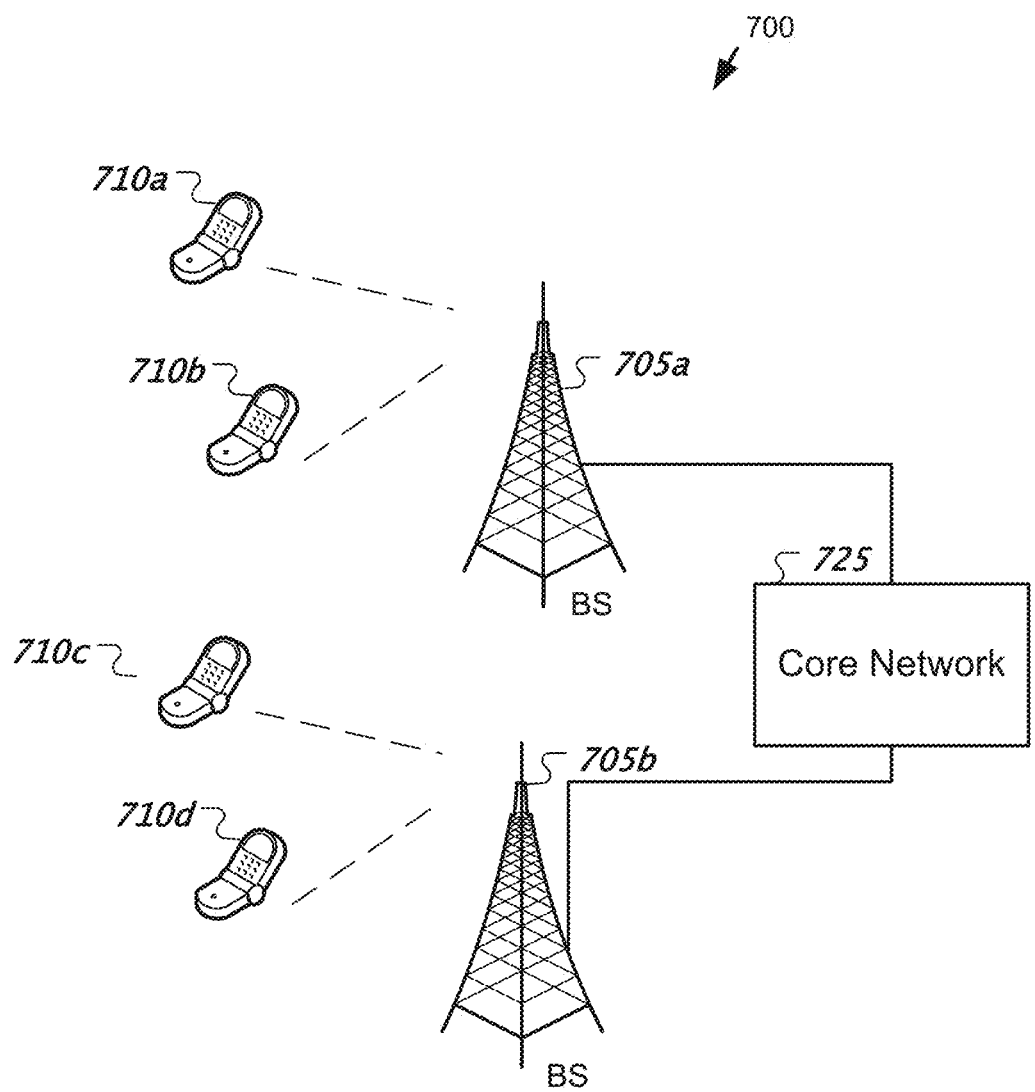
FIG. 7 shows an example of a wireless communication system where techniques in accordance with one or more embodiments of the present technology can be applied.

FIG. 7 shows an example of a wireless communication system where techniques in accordance with one or more embodiments of the present technology can be applied. A wireless communication system 700 can include one or more base stations (BSs) 705a, 705b, one or more wireless devices 710a, 710b, 710c, 710d, and a core network 725. A base station 705a, 705b can provide wireless service to wireless devices 710a, 710b, 710c and 710d in one or more wireless sectors. In some implementations, a base station 705a, 705b includes directional antennas to produce two or more directional beams to provide wireless coverage in different sectors.

The core network 725 can communicate with one or more base stations 705a, 705b. The core network 725 provides connectivity with other wireless communication systems and wired communication systems. The core network may include one or more service subscription databases to store information related to the subscribed wireless devices 710a, 710b, 710c, and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The wireless devices 710a, 710b, 710c, and 710d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 8:
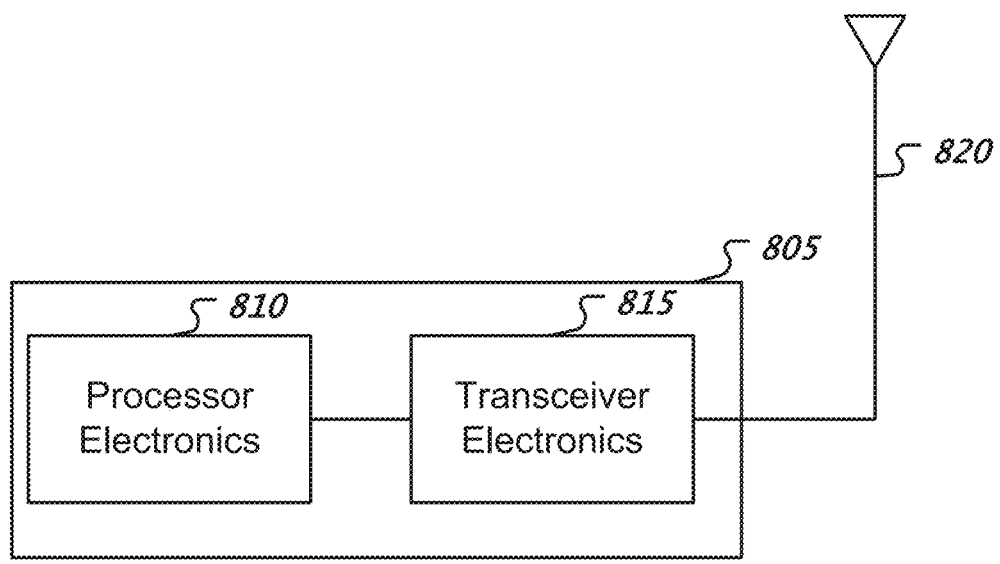
FIG. 8 is a block diagram representation of a portion of a hardware platform.

FIG. 8 is a block diagram representation of a portion of a hardware platform. A hardware platform 805 such as a network device or a base station or a wireless device (or UE) can include processor electronics 810 such as a microprocessor that implements one or more of the techniques presented in this document. The hardware platform 805 can include transceiver electronics 815 to send and/or receive wired or wireless signals over one or more communication interfaces such as antenna 820 or a wireline interface. The hardware platform 805 can implement other communication interfaces with defined protocols for transmitting and receiving data. The hardware platform 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the hardware platform 805.

CONCLUSION

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a first network node, a first message from a second network node, the first message including slice remapping assistance information comprising one or more target network slices; and
   handing over, based on a handover procedure, a network service for a terminal from the first network node to a target network node using the one or more target network slices,
   wherein the first message, sent from the second network node comprising a first core network node to the first network node comprising a first radio access network (RAN) node, comprises an initial context setup request message.

2. The method of claim 1, wherein the slice remapping assistance information comprises an indicator indicative of whether network slice remapping is supported by a core network node or a radio access network (RAN) for a specific terminal, a specific network slice, or a specific PDU session.

3. The method of claim 2, wherein the indicator is configured 1) by a separate list, as part of an allowed network slice selection assistance information listing, or as part of a slice support list item or 2) as a separate information element or an information element inside a transparent container in a message containing the information allowing the first network node to perform network remapping.

4. The method of claim 1, wherein the slice remapping assistance information comprises 1) the one or more target network slices of a network slice for a specific terminal, a specific slice, or a specific Protocol Data Unit (PDU) session, or 2) a cause value indicative of a reason that network remapping is not allowed, or 3) a quality of service (QOS) profile for each QoS flow in the one or more target network slices.

5. The method of claim 4, wherein the slice remapping assistance information is transmitted from a RAN node to a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message.

6. The method of claim 1, wherein information allowing the first network node to perform network remapping is transmitted from the first network node to the target network node comprising a second RAN node via any of: a XN setup response message, a XN setup request message, a handover request message, a handover request acknowledge message, a handover preparation failure message, a retrieve terminal context request message, and a retrieve terminal context response message.

7. The method of claim 1, wherein performing the handover procedure further comprises:
   remapping, by the first network node, a specific network slice to a target network slice of the one or more target network slices.

8. The method of claim 7, further comprising:
   sending, by the first network node, the target network slice to the target network node and/or a third network node.

9. The method of claim 8, wherein the third network node is a second core network node.

10. The method of claim 8, wherein the target network slice is sent from the first network node to second 1) the target network node comprising a second RAN node via any of a XN setup response message, a XN setup request message, a handover request message, a handover request acknowledge message, a handover preparation failure message, a retrieve terminal context request message, or a retrieve terminal context response message or 2) a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, or a path switch request message.

11. The method of claim 1, further comprising:
initiating, by the first network node, a NG/S1 based handover procedure or a Xn/X2 based handover procedure to the second network node based on the slice remapping assistance information indicating that slice remapping is supported at the second network node.

12. The method of claim 11, further comprising:
sending, by the first network node, the slice remapping assistance information to the second network node configured to map a serving network slice to a target network slice based on the received slice remapping assistance information.

13. The method of claim 11, wherein the second network node is configured to remap a certain network slice to a target network slice.

14. The method of claim 13, wherein the target network slice is sent from 1) a core network node to a RAN node via any of an initial context setup request message, a PDU session resource modify request message, a PDU session resource setup request message, a handover command message, a handover request message, a path switch request acknowledge message, a path switch request failure message, or a UE context modification request message, 2) a first RAN node to a second RAN node via any of a XN setup response message, a XN setup request message, a handover request message, a handover request acknowledge message, or a handover preparation failure message, or 3) a RAN node to a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, or a path switch request message.

15. The method of claim 1, further comprising:
initiating, by the first network node, a terminal context retrieve procedure to a second network node based on the slice remapping assistance information indicating that network slice remapping is supported at the second network node; and
sending, by the first network node, slice remapping assistance information that includes slice assistance information to the second network node configured to map a serving network slice to a target network slice to assist in performing network slice remapping.

16. The method of claim 15, wherein the second network node is configured to 1) remap a serving network slice to a target network slice or or 2) send the target network slice to the first network node or a third network node.

17. The method of claim 16, wherein the target network slice is sent from a RAN node to 1) a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message or 2) a second RAN node via any of a retrieve UE context request message and a retrieve UE context response message.

18. An apparatus for wireless communication comprising processor electronics that is configured to carry out a method of:
receiving, by a first network node, a first message from a second network node, the first message including slice remapping assistance information comprising one or more target network slices; and
handing over, based on a handover procedure, a network service for a terminal from the first network node to a target network node using the one or more target network slices,
wherein the first message, sent from the second network node comprising a first core network node to the first network node comprising a first radio access network (RAN) node, comprises an initial context setup request message.

19. A non-transitory computer readable medium having code stored thereon, the code when executed by processor electronics, causing the processor electronics to implement a method of
receiving, by a first network node, a first message from a second network node, the first message including slice remapping assistance information comprising one or more target network slices; and
handing over, based on a handover procedure, a network service for a terminal from the first network node to a target network node using the one or more target network slices,
wherein the first message, sent from the second network node comprising a first core network node to the first network node comprising a first radio access network (RAN) node, comprises an initial context setup request message.

* * * * *